United States Patent [19]

Shiraki et al.

[11] Patent Number: 4,852,907
[45] Date of Patent: Aug. 1, 1989

[54] PAD FOR AIR BAG DEVICE

[75] Inventors: Kouji Shiraki, Gifu; Minoru Niwa, Ichinomiya; Kuniyasu Itou, Hashima; Tadashi Yamamoto, Aichi; Mitsuru Harata, Nagoya, all of Japan

[73] Assignee: Toyoda Gosei Co., Ltd., Nishikasugai, Japan

[21] Appl. No.: 177,976

[22] Filed: Apr. 5, 1988

[30] Foreign Application Priority Data

| Apr. 6, 1987 | [JP] | Japan | 62-84293 |
| Apr. 6, 1987 | [JP] | Japan | 62-84292 |
| Apr. 6, 1987 | [JP] | Japan | 62-84290 |
| Apr. 6, 1987 | [JP] | Japan | 62-84291 |
| May 26, 1987 | [JP] | Japan | 62-79505[U] |
| May 26, 1987 | [JP] | Japan | 62-79504[U] |

[51] Int. Cl.$^4$ .................................................. B60R 21/16
[52] U.S. Cl. .................................... 280/731; 280/728; 280/743
[58] Field of Search ............... 280/728, 730, 731, 732, 280/743

[56] References Cited

U.S. PATENT DOCUMENTS

| 3,907,330 | 9/1975 | Kondo et al. | 280/731 |
| 3,982,774 | 9/1976 | Ivashuk et al. | 280/737 |
| 4,120,516 | 10/1978 | Takamatsu et al. | 280/728 |
| 4,148,503 | 4/1979 | Shiratori et al. | 280/731 |
| 4,334,699 | 6/1982 | Patzelt et al. | 280/731 |
| 4,752,083 | 6/1988 | Honda | 280/731 |

FOREIGN PATENT DOCUMENTS 51-25342  2/1976  Japan .
53-24751  6/1978  Japan .

Primary Examiner—Kenneth R. Rice
Attorney, Agent, or Firm—Cushman, Darby & Cushman

[57] ABSTRACT

There is disclosed a pad for use in an air bag device enclosing an air bag which inflates in case of an accident. The device is mounted to mount members disposed around the bag. The pad is shaped like a box, and comprises an upper wall and side walls extending downward from the fringes of the upper wall. The pad is molded integrally with an insert on which a coat layer is formed out of a soft synthetic resin. The coat layer has a thin-walled portion that breaks when the air bag inflates. The thin-walled portion is disposed at a given position on the upper wall. The insert comprises a rectangular tubular base portion made from a synthetic resin and a plurality of flexible nets disposed on opposite sides of the thin-walled portion. The base portion is disposed inside the side walls. The nets are disposed on the upper wall and connected to the top of the base portion. An attachment portion for mounting the pad to the mount members and setting portions for setting the pad in a mold used to mold the coat layer are formed on the base portions.

18 Claims, 29 Drawing Sheets

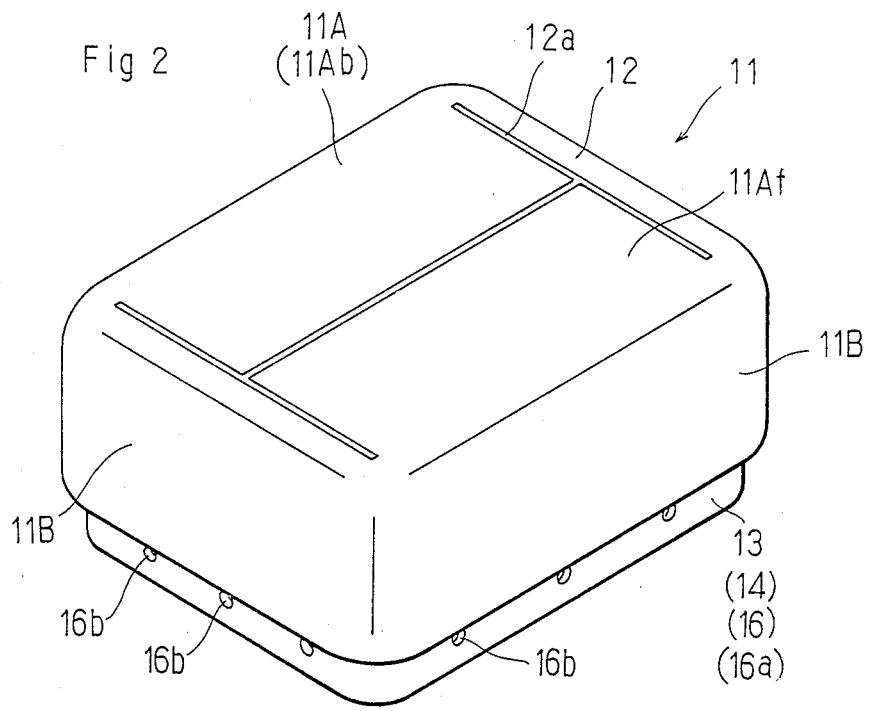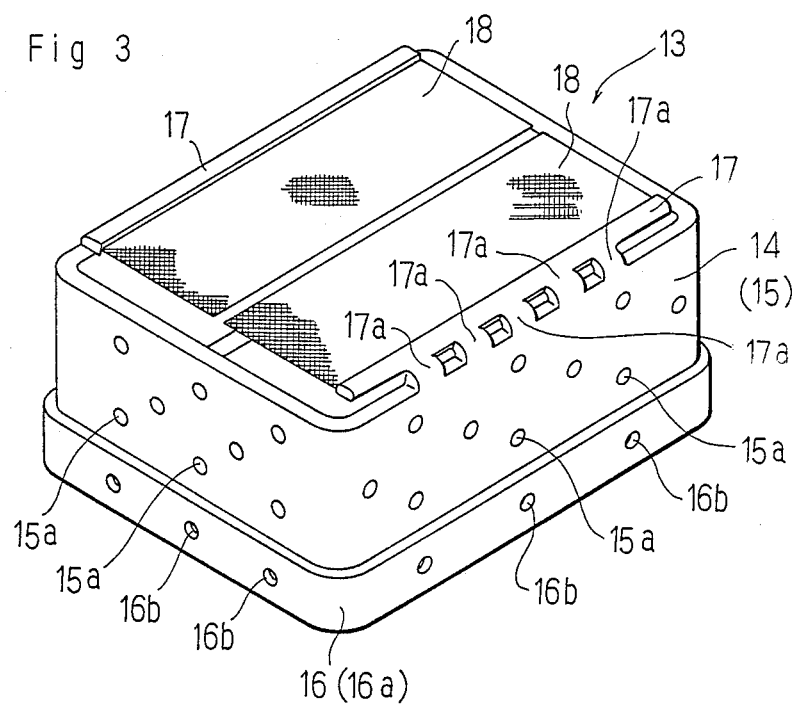

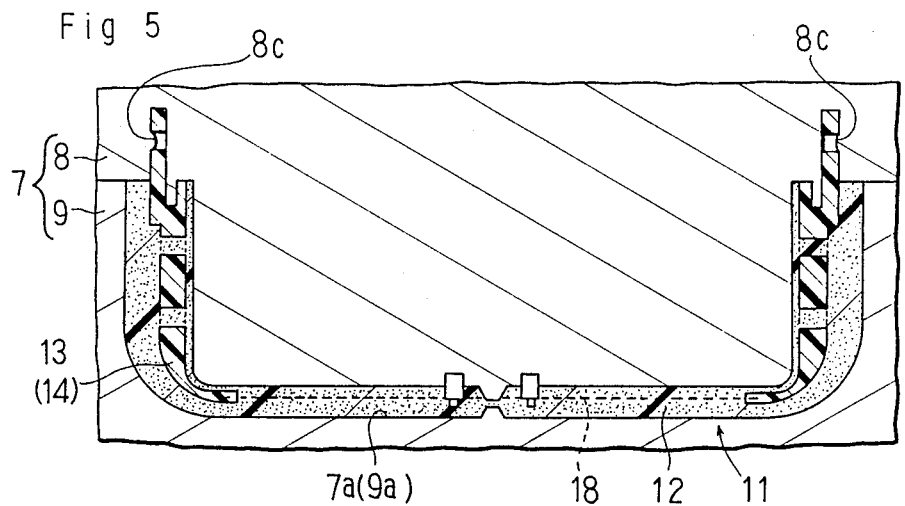
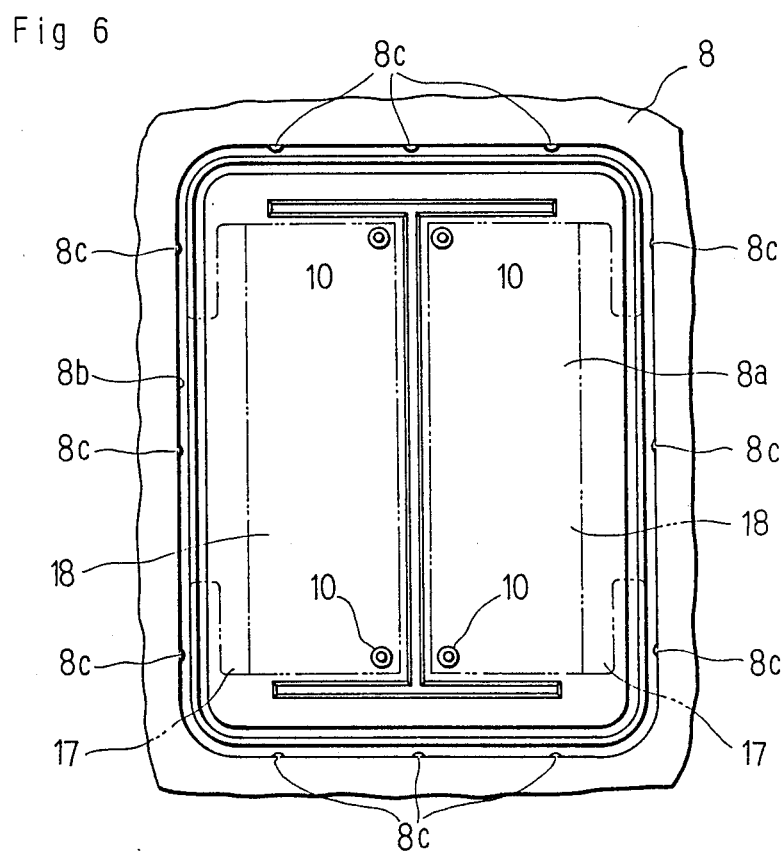

PAD FOR AIR BAG DEVICE

BACKGROUND OF THE INVENTION

1. Field of the Invention

The present invention relates to a pad for use in an air bag device installed in an automobile and enclosing an air bag that inflates in case of an accident.

2. Description of the Prior Art

A conventional pad of this kind is shaped like a box, and comprises an upper wall and side walls extending downward from the fringes of the upper walls. The pad consists mainly of a soft synthetic resin, and the upper wall has a thin-walled portion to permit the upper wall to break at a given position, in order that the air bag can be thrown out of the pad and inflate greatly over the pad in case of an accident.

Also in the conventional pad of this kind, flexible meshy nets are embedded in the upper wall and in the side walls except for the thin-walled portion to prevent the pad from breaking and becoming scattered about when the air bag swells. Further, an annular band which is made from aramid fiber or other material exhibiting a high tear resistance is seamed to the nets near the bottoms of the side walls of the pad (see Japanese Patent Laid-Open No. 110643/1980, U.S. Pat. No. 4,334,699)

In fabricating the pad as described above, if the nets and the band which have been seamed together are disposed between inside and outside coat layers of a soft synthetic resin, and if these coat layers are manufactured separately, then a large number of manufacturing steps are needed.

Preferably, therefore, the nets to which the band has been seamed is used as an insert that is set afloat by engaging a number of set pins protruding from the inner surface of a mold, for forming the coat layers.

However, when the insert is placed in position, it is necessary that it assume a box-like form substantially conforming to the shape of the pad while set afloat over the surface of the mold. Since the nets and the band constituting the insert are made from a flexible material, the insert bends easily. For this reason, it is cumbersome to set the insert in position.

SUMMARY OF THE INVENTION

It is an object of the present invention to provide a pad which is for use in an air bag device and which enables an insert to be easily set in a mold when a coat layer is molded.

The above object is achieved in accordance with the teachings of the invention by a pad for use in an air bag device, the pad comprising: an upper wall; side walls extending downward from the fringes of the upper wall; inserts disposed inside the upper wall and the side walls; a coat layer made from a soft synthetic resin by injection molding, the layer being formed on the upper wall and the side walls so as to cover the inserts; a thinwalled portion which is formed in the coat layer on the upper wall and which, when the bag inflates, breaks; a rectangular tubular base portion made from a synthetic resin and forming the inserts inside the side walls; a plurality of flexible nets which form the inserts inside the upper wall, are disposed on opposite sides of the thin-walled portion of the coat layer, and are connected to the top portion of the base portion; an attachment portion formed on the base portion and mounted to mount members; and setting portions which are formed on the base portion and which, when the coat layer is molded, set the inserts in a mold.

In the novel pad for use in the air bag device constructed as described above, when the coat layer is molded, the inserts can be set in the mold by the setting portions. Because the base portion is made from a synthetic resin and retains its original shape, and because it is rectangular tubular in shape, the base portion can be readily placed in position so as not to be in contact with the inner surface of the mold simply by setting the setting portions of the base portion in the given mold. Then, it is only necessary to engage the nets on the upper wall of the pad with certain set pins on the mold.

In one feature of the novel pad for use in the air bag device, not all the inserts are flexible and so it is easy to set the inserts in the mold when the coat layer is molded.

BRIEF DESCRIPTION OF THE DRAWINGS

FIG. 2 is a perspective view of the pad shown in FIG. 1;

FIG. 3 is a perspective view of an insert used in the pad shown in FIGS. 1 and 2;

FIG. 5 is a cross-sectional view of the mold shown in FIG. 4, the mold being used to mold the pad shown in FIGS. 1 and 2;

FIG. 6 is a bottom view of a movable mold half used to mold the pad shown in FIGS. 1 and 2;

DESCRIPTION OF THE PREFERRED EMBODIMENTS

Figure 1:
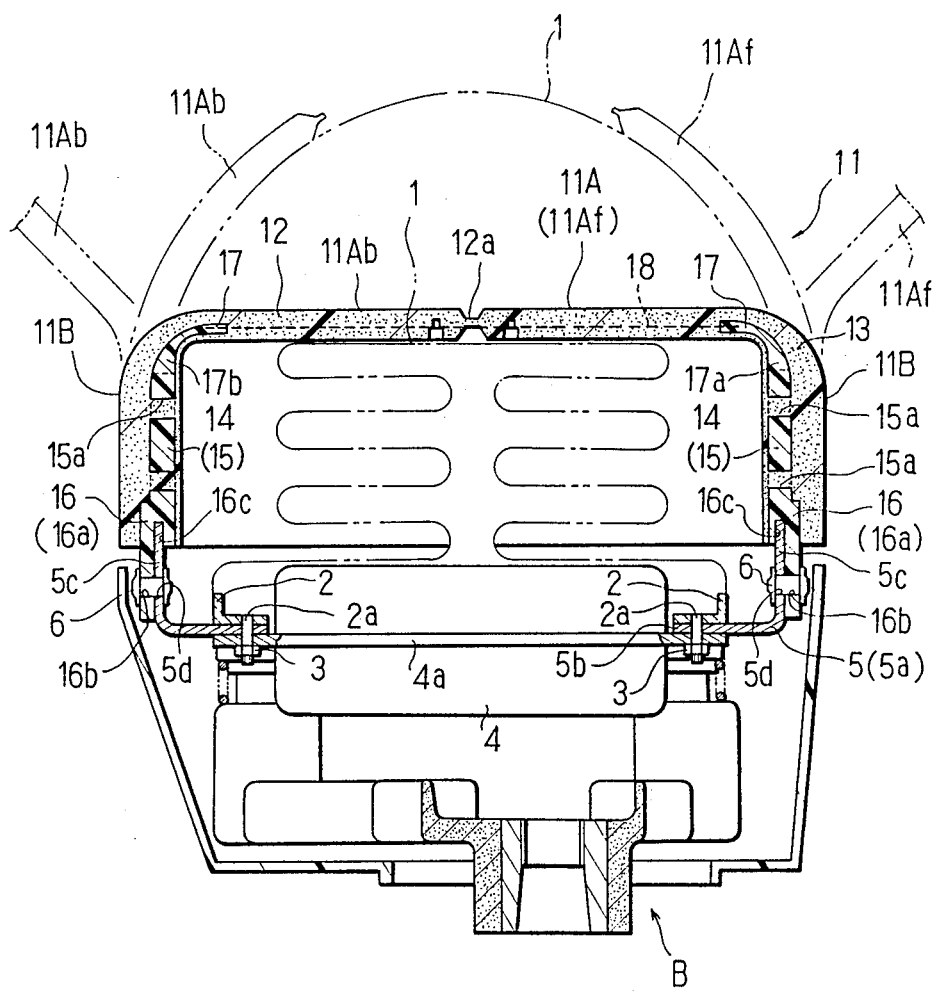
FIG. 1 is a cross-sectional view of a pad according to the invention, for showing the manner in which it is used.

Referring to FIGS. 1-3, a pad 11 for use in an air bag device is disposed around an air bag 1 that is placed on the boss B of the steering wheel of an automobile. The pad 11 is shaped like a rectangular parallelepiped, and comprises a substantially rectangular upper wall 11A and four side walls 11B extending downward from the fringes of the upper wall 11A. A coat layer 12 made from a soft synthetic resin, such as urethane, is formed on an insert 13. The coat layer 12 on the upper wall 11A is provided with a substantially H-shaped thin-walled portion 12a to permit the upper wall 11A to readily break into a front portion 11Af and a rear portion 11Ab when the bag 1 inflates.

The insert 13 consists of a box-like base portion 14 and two rectangular nets 18. The base portion 14 is located inside the side walls 11B. The nets 18 are disposed on the upper wall 11A of the pad and on opposite sides of the thin-walled portion 12a of the coat layer 12. The nets 18 are coupled to the top of the base portion 14. Each net 18 is of about 1 mm mesh and woven from a synthetic fiber, such as polyamide, and exhibits flexibility.

The base portion 14 is made from a rigid or semirigid synthetic resin, such as polyamide, vinyl chloride, or polyolefin. The base portion 14 includes a body portion 15 and an attachment portion 16. Retaining portions 17 are formed integrally with the base portion 14.

The body portion 15 is shaped like a box and located along the side walls 11B of the pad. A plurality of holes 15a extend through the body portion 15 to prevent the coat layer 12 from peeling off. The attachment portion 16 is employed to mount the pad 11 to backup plate 5 that acts as mount members as described later. The attachment portion 16 is disposed on the underside of the body portion 15, and has an attaching plate portion 16a and an annular groove 16c. The plate portion 16a is provided with holes 16b used for mounting purposes.

The attaching plate portion 16a extends along the whole outer periphery of the bottom of the body portion 15 and downward. The plate portion 16a has the holes 16b at given positions, the hole 16b extending through the plate portion 16a. The annular groove 16c is formed in the inner surface of the attaching plate portion 16a, and extends along the whole periphery of the bottom of the body portion 15. The backup plate have vertical wall portions 5c (described later) which are fitted in the groove 16c.

In the illustrated example, the attaching plate portion 16a and the groove 16c extend continuously along the whole periphery of the bottom of the body portion 14. Also, the plate portion 16a and the groove 16c can be made noncontinuous. Of course, in this case, the vertical wall portion 5c of the backup plate 5 have protrusions corresponding to the groove 16c.

The two retaining portions 17 are formed on the top of the body portion 15 in an opposite relation to each other. The retaining portions 17 are bent toward the center of the upper wall 11A of the pad. Each retaining portion 17 consists of several, five in the illustrated example, connecting arms 17a. The arms 17a are connected together at their front ends. Ends of the nets 18 are embedded in the arms 17a.

The backup plate 5 holds a gas supplier 4 that supplies gas into the air bag 1 in case of an accident, as well as the pad 11. The plate 5 is rigidly fixed to the core metal (not shown) of the steering wheel.

The backup plate 5 has a substantially rectangular bottom wall 5a and the aforementioned vertical wall portion 5c extending upward from the fringe of the bottom wall 5a. The bottom wall 5a is centrally provided with a hole 5b extending through it. The vertical wall portion 5c is formed with holes 5d which are so located that, when the vertical wall portion 5c is fitted into the annular groove 16c in the base portion 14, the hole 5d register with the holes 16b in the attaching plate portion 16a.

Each member is mounted to the backup plate 5 in the manner described below. The gas generator 4 is inserted into the hole 5b from below. The flange portion 4a of the generator is brought into contact with the lower surface of the fringe of the hole 5b. An annular retaining plate 2 firmly fixed to the underside of the air bag 1 has a bolt 2a. This bolt 2a is caused to protrude to the underside of the flange portion 4a from the upper surface of the bottom wall 5a of the backup plate. A nut 3 is screwed to the bolt 2a. Thus, the bag 1 and the gas supplier 4 are mounted to the backup plate 5.

Figure 7:
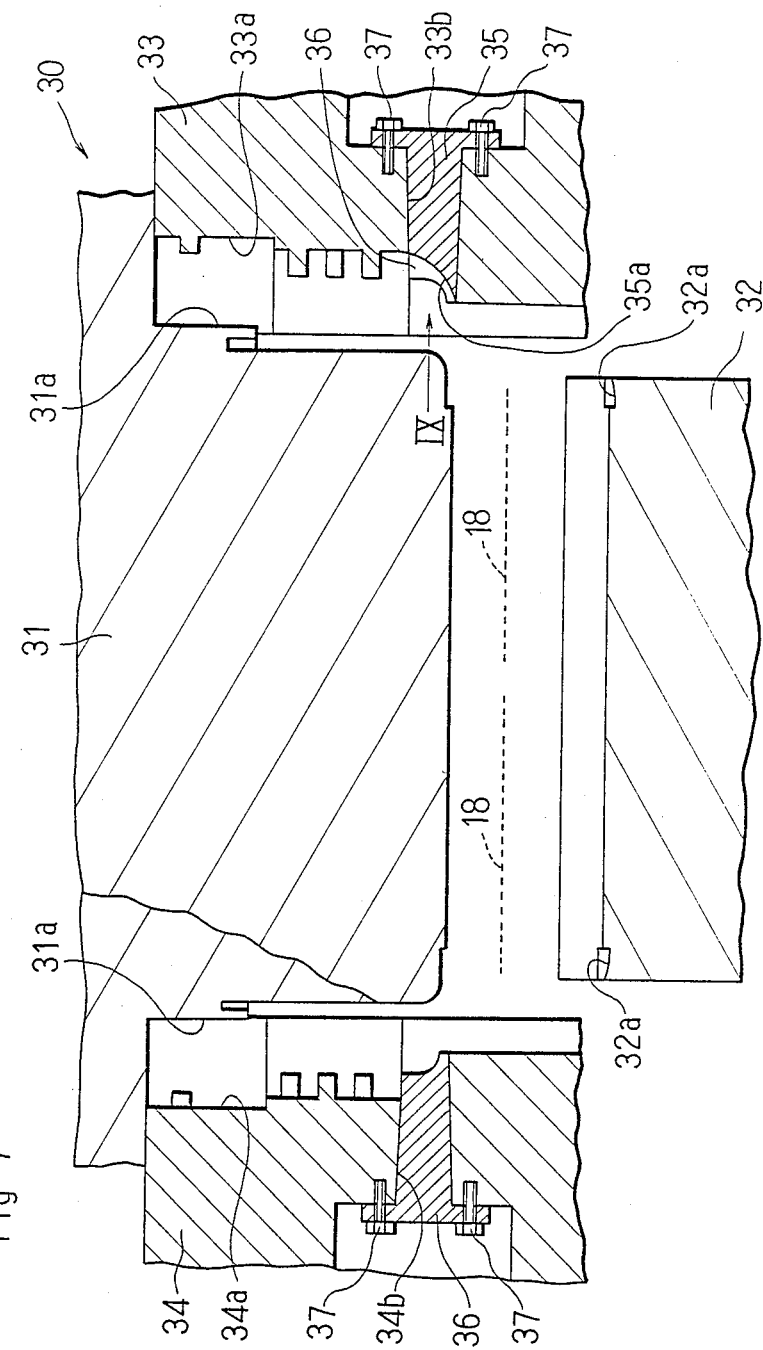
FIG. 7 is a cross-sectional view of a mold used to mold the insert shown in FIG. 3.
Figure 8:
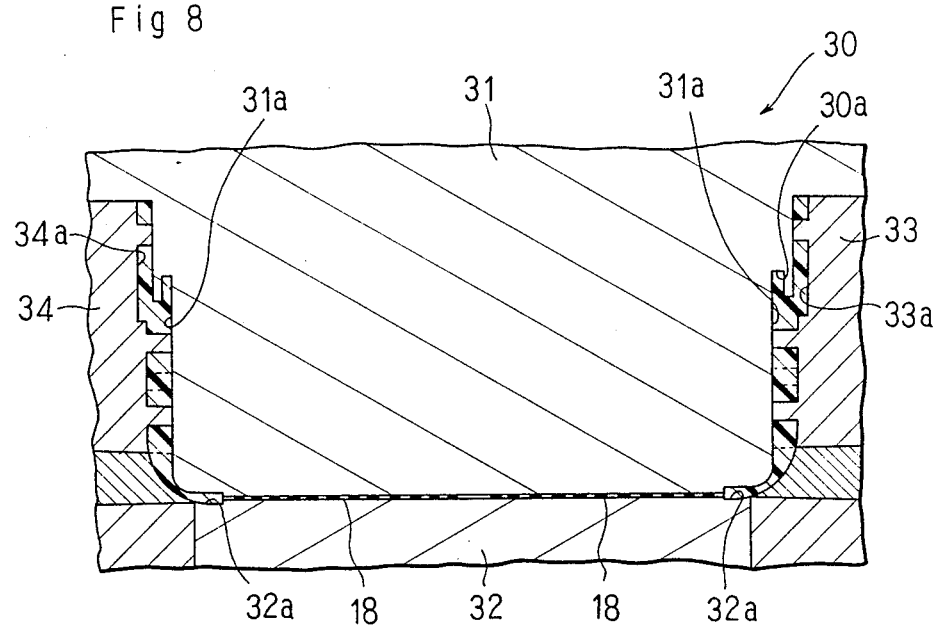
FIG. 8 is a cross-sectional view of the mold shown in FIG. 7, for showing the manner in which the insert shown in FIG. 3 is molded.
Figure 9:
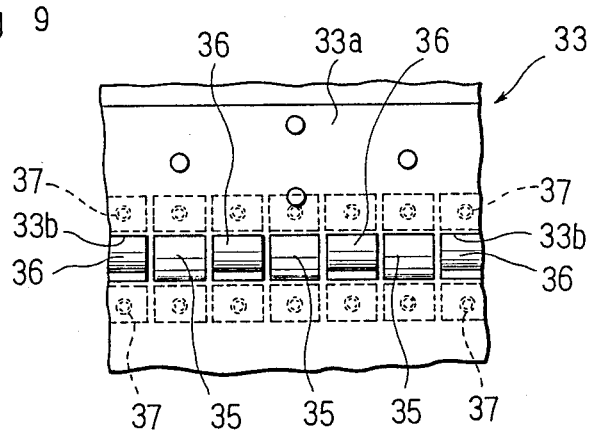
FIG. 9 is a view taken in the direction indicated by the arrow IX of FIG. 7.

The pad 11 is molded as described below. The nets 18 are molded integrally with the base portion 14 as inserts to fabricate the insert 13. A mold 30 is used to mold the insert 13. As shown in FIGS. 7-9, the mold 30 comprises a stationary mold half 31, a movable mold half 32, and slide cores 33 and 34. When the mold is closed, a given cavity 30a is formed. These components have mold surfaces 31a, 32a, 33a, 34a, respectively. The mold 30 further includes two slide cores (not shown) for forming the outer surface of the body portion 15 not having the retaining portions 17 of the base portion 14 and the outer surface of the attachment portion 16. The two slide cores (not shown) are arranged vertical to the sheets of FIGS. 7 and 8.

The slide cores including the cores 33 and 34 have protrusions at given positions. These protrusions are used to form the holes 15a in the body portion 15 and the holes 16b in the attachment portion 16.

The slide cores 33 and 34 which serve to roughly form the outer surfaces of the retaining portions 17 are provided with tapering holes 33b and 34b. The total number of these holes 33b, 34b is equal to the sum of the number of the connecting arms 17a and the number of the spaces between these arms. In the illustrated example, the total number is nine. Core blocks 35 and 36 that are fixed to the slide cores 33 and 34, respectively, by bolts 37 are fitted in the holes 33b and 34b, respectively.

The front end surface 35a of each core block 35 can roughly form the outer surface of each connecting arm 17a. When the mold is closed, the front end of each core block 36 bears against the inner surface 31a of the stationary mold half 31.

Accordingly, those portions on which the core blocks 35 are disposed can mold the connecting arms 17a. Those portions on which the core blocks 36 are disposed mold the outer surfaces of the spaces between the arms 17a. In the illustrated example, the core blocks 35 and 36 are alternately disposed in the tapering holes 33b and 34b.

When the mold is opened, the nets 18 are placed in position. Then, the mold is closed, and a molding material is injected into the cavity 30a from a gate (not shown) to mold the insert 13. Thereafter, the mold is opened, and the movable mold half is moved away from the stationary mold half to obtain the desired insert 13.

Of course, the number, the width, the thickness, the arrangement, or other factor of the connecting arms 17a can be easily changed by appropriately selecting the core blocks 35, 36 and placing them in the tapering holes 33b and 34b in the slide cores 33 and 34.

Figure 4:
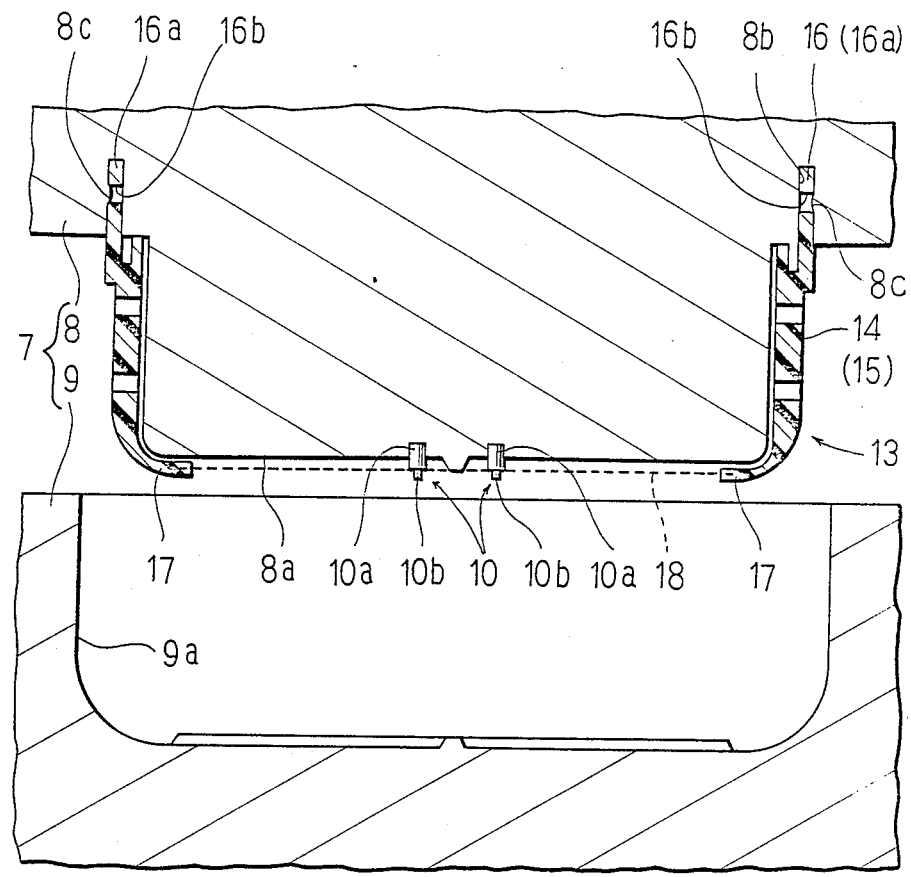
FIG. 4 is a cross-sectional view of a mold in which the insert shown in FIG. 3 is set.

The insert 13 fabricated in this way is set in a mold 7 which is used to mold the pad 11. As shown in FIGS. 4 and 5, the mold 7 comprises a movable mold half 8 and a stationary mold half 9 which have given inner surfaces 8a and 9a, respectively, for forming a given cavity 7a when the mold is closed.

As shown in FIGS. 4-6, four set pins 10 are pressed into the inner surface 8a of the movable mold half 8. Two of the pins 10 are located near the front end of one net 18 of the insert 13 and close to the other net 18 when the insert 13 is placed in position.

Each set pin 10 has an enlarged portion 10a and a reduced portion 10b. The outside diameter of the enlarged portion 10a is larger than the meshes of the nets 18. The reduced portion 10b can be inserted into the meshes of the nets 18. The outside diameter of the reduced portion 10b gradually increases from its front end toward the enlarged portion 10a. The outside diameter of the reduced portion 10b as measured on the side of the enlarged portion 10a is set slightly larger than the meshes of the nets 18 to prevent the nets 18 from coming off after the insert 13 has been placed in position.

The movable mold half 8 has an annular groove 8b in which the attaching plate portion 16a of the insert 13 is fitted when the insert 13 is placed in position. The inner surface of the groove 8b has semispherical retaining protrusions 8c at given positions. When the insert 13 is set in position, the protrusions 8c are inserted in the holes 16c in the attaching plate portion 16a and can engage the fringes of the holes 16b. That is, the setting portion for the base portion 14 of the insert 13 is constituted by the attachment portion 16 of the pad 11.

The pad 11 is molded, using the mold 7, in the manner described below. When the mold is opened, the base portion 14 of the insert 13 is placed in the movable mold half 8. In particular, the attaching plate portion 16a is fitted into the annular groove 8b in the movable mold half 8, and the fringes of the holes 16b are caused to engage the retaining protrusions 8c. Since the base portion 14 is made from a synthetic resin and retains its original shape, the base portion can be readily held and so it can be placed in position easily. Thereafter, the base portion 14 takes a box-like shape, and is held from the outside via the retaining protrusions 8c. Therefore, the base portion 14 can be retained at a desired position with certainty.

Subsequently, the front sides of the two nets 18 are pulled and anchored to the set pins 10. Thus, as shown in FIG. 4, the insert 13 can be readily set in position while afloat above the inner surface 8a of the movable mold half 8.

Then, the mold is closed. A molding material is injected into the cavity 7a in the mold 7 via a gate (not shown) to mold the pad 11 in which the insert 13 is embedded, the insert 13 consisting of the nets 18 and the base portion 14, as shown in FIG. 5. Subsequently, the mold is opened, and the movable mold half is separated from the stationary mold half to obtain the desired pad 11.

The vertical wall portions 5c of the backup plate 5 fabricated in this way are fitted into the annular groove 16c in the attachment portion 16. Rivets 6 are inserted in their holes 16b and 5d. In this way, the pad 11 can be mounted on the backup plate 5 on which the air bag 1 and the gas supplier 4 have been mounted. When the vertical wall portions 5c of the backup plate 5 are fitted into the annular groove 16c in the pad 11, the pad 11 and the backup plate 5 can be simultaneously placed in position vertically and horizontally, and can be easily fixed by the rivets 6.

Under the condition in which the air bag device carrying the pad 11 with it has been mounted to the boss B of the steering wheel, when the air bag 1 inflates, the thin-walled portion 12a breaks. As a result, the upper wall 11A of the pad breaks into the upper portion 11Af and the rear portion 11Ab, as shown in FIG. 1. The force needed to inflate the bag 1 depends greatly on the elastic limit of the retaining portions 17 of the insert 13. In order to adjust this elastic limit, the number, the width, the thickness, and so on of the connecting arms 17a of the retaining portions 17 can be easily increased or decreased as mentioned previously. Consequently, with this pad 11, the force needed to inflate the air bag 1 can be easily adjusted.

Figure 10:
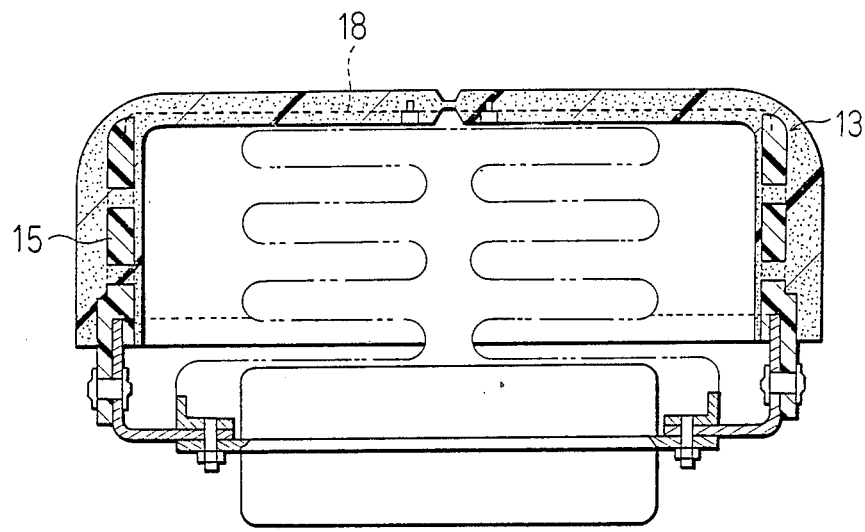
FIG. 10 is a cross-sectional view of a modification of the insert shown in FIG. 3.

In the pad 11 described above, the retaining portions 17 of the base portion 14 of the insert 13 extend slightly toward the center of the upper wall 11A of the pad 11. In the pad 11 shown in FIG. 10, the body portion 15 extends upward. The upper ends of these extending portions hold the nets 18. Also in the pad shown in FIG. 10, the insert 13 is not totally flexible and, therefore, the insert 13 can be set in the mold 7 with greater ease than conventional.

Figure 11:
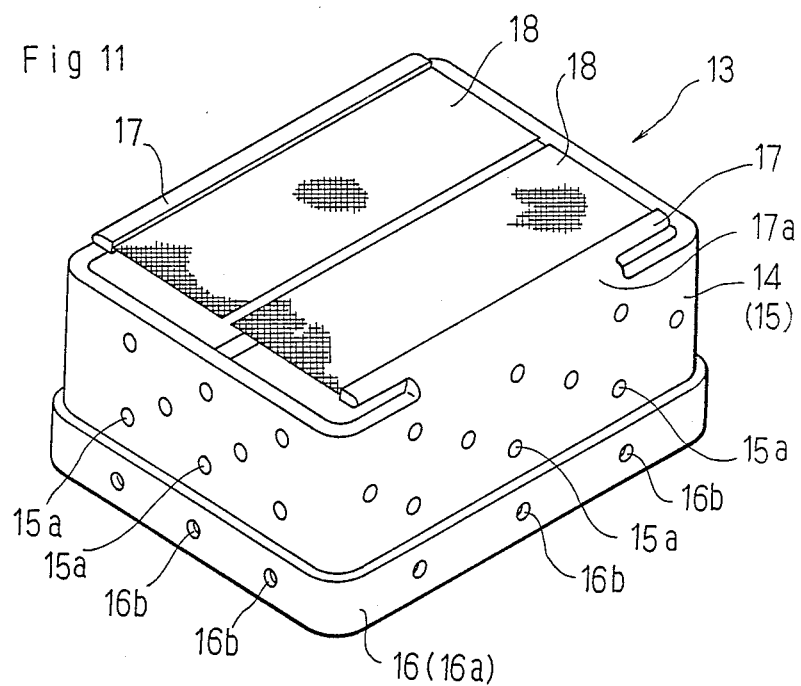
FIG. 11 is a perspective view of another modification of the insert shown in FIG. 3.

In the pad 11 described first, the connecting arms 17a of each retaining portion 17 of the insert 13 are five in number. The insert 13 shown in FIG. 11 has only one connecting arm 17a. The thickness of the arm 17a is adjusted with the mold 30.

Figure 12:
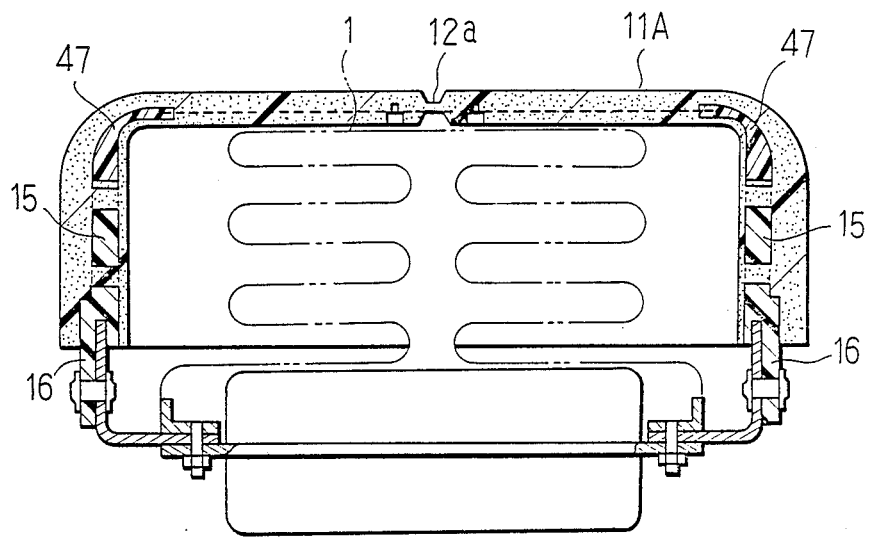
FIG. 12 is a cross-sectional view of a still other modification of the insert shown in FIG. 3.
Figure 13:
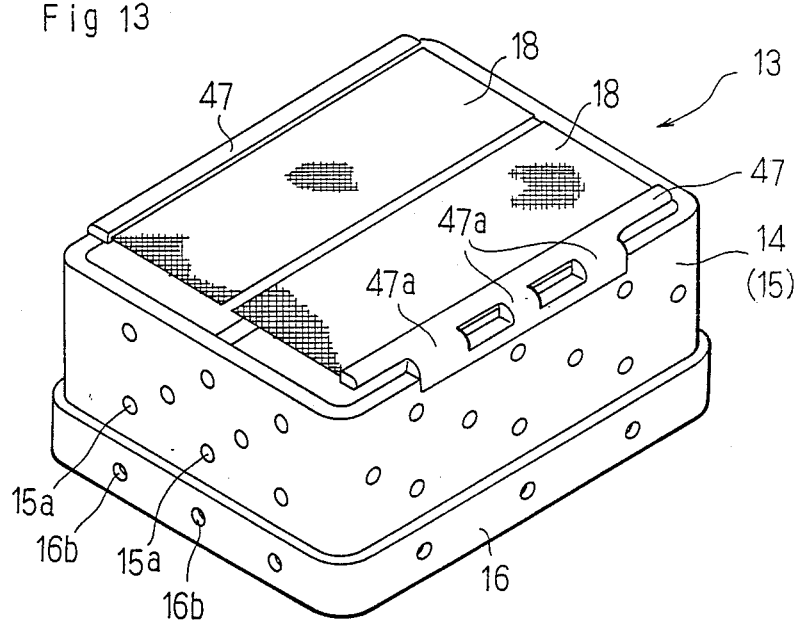
FIG. 13 is a perspective view of the insert shown FIG. 12.

In the pad 11 shown in FIGS. 1 and 2, the retaining portions 17 of the base portion 14 of the insert 13 are made from the same synthetic resin as the body portion 15 and the attachment portion 16. As shown in FIGS. 12 and 13, each retaining portion 47 consists of three connecting arms 47a. The retaining portion 47 can be made from a material different from the material of the body portion 15 and the attachment portion 16, such as a soft rubber or a high polymer elastic material, as for example a thermoplastic elastomer. In this case, the elastic limit of the upper wall 11A of the pad which opens subsequently to breakage of the thin-walled portion 12a when the air bag 1 inflates can be adjusted by appropriately selecting the elasticity of the material of the retaining portions 47. Hence, the force required to inflate the bag 1 can be adjusted.

Figure 14:
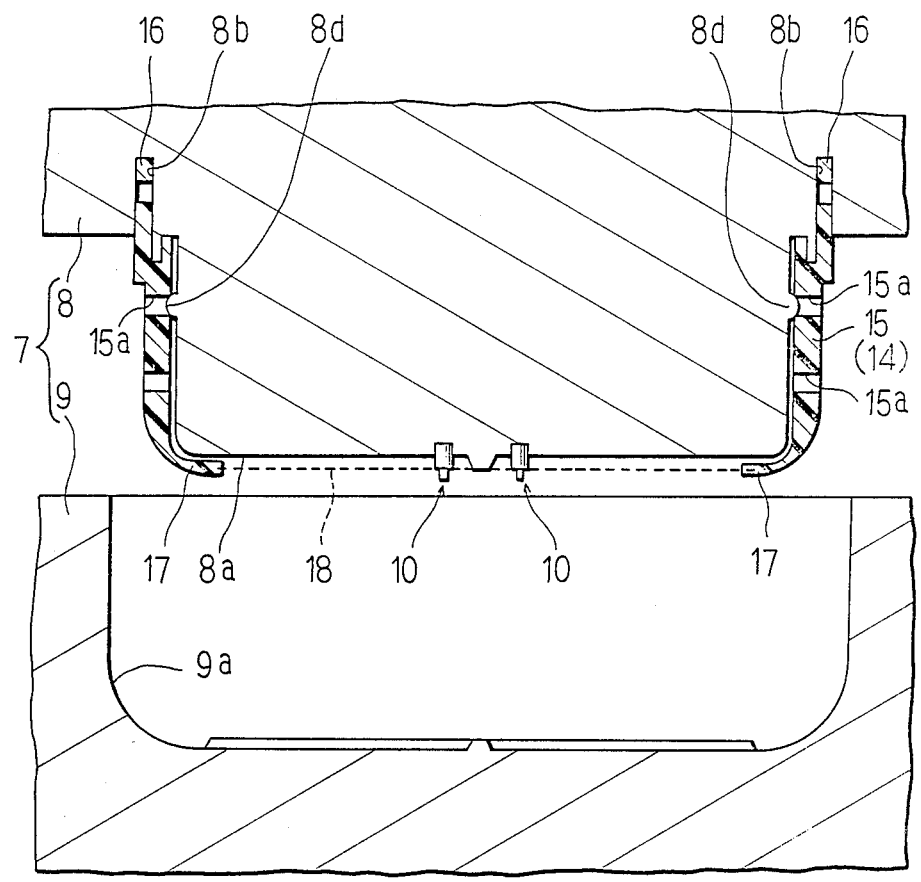
FIG. 14 is a cross-sectional view of another mold used to mold the pad shown in FIGS. 1 and 2.

In the first-mentioned pad 11 shown in FIGS. 1 and 2, when the coat layer 12 is formed, the insert 13 is set in the movable mold half 8, using the attachment portion 16 of the base portion 14. As shown in FIG. 14, semispherical retaining protrusions 8d can be formed on the inner surface 8a of the movable mold half 8. The protrusions 8d can be inserted into some of the holes 15a extending through the body portion 15. The holes 15a are used to prevent the coat layer 12 from peeling off. The fringes of the holes 15a can engage the protrusions 8d. These holes 15a may be used as setting portions.

Figure 15:
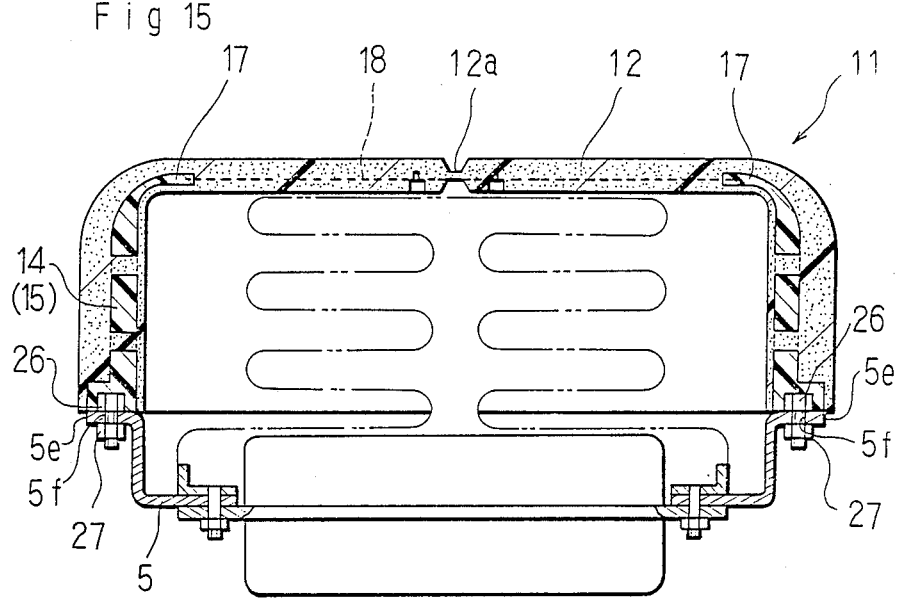
FIG. 15 is a cross-sectional view of the pad shown in FIGS. 1 and 2, for showing another way in which the pad is mounted to mount members.
Figure 16:
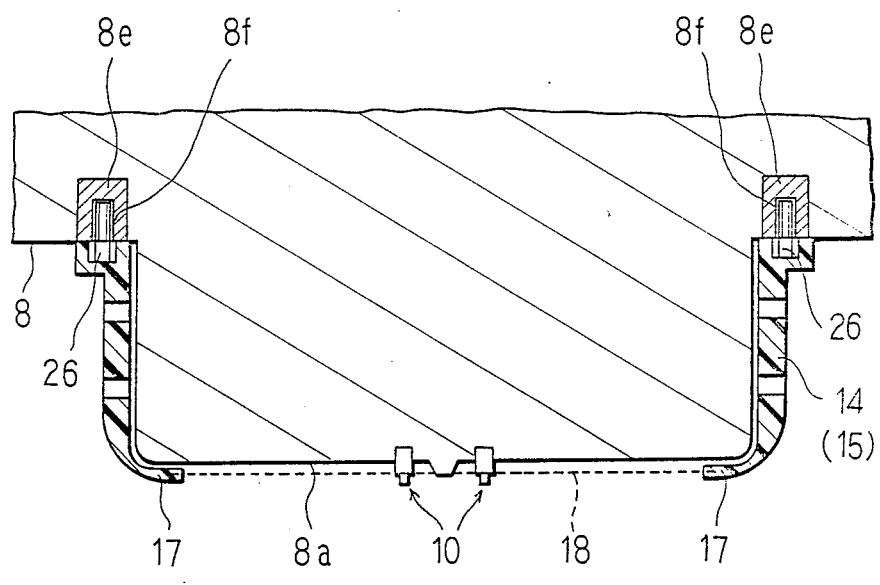
FIG. 16 is a cross-sectional view of a mold in which the insert of the pad shown in FIG. 15 is set.

Also in the pad 11 shown in FIGS. 1 and 2, the attachment portion 16 mounted to the backup plate 5 comprises the attaching plate portion 16a having the holes 16b and the annular groove 16c. As shown in FIG. 15, bolts 26 made from a magnetic substance are embedded as attachment portions at given positions in the lower portions of the base portion 14. The backup plate 5 is provided with flanges 5e having holes 5f corresponding to the bolts 26. The bolts 26 are inserted in the holes 5f and fixed with nuts 27. In this case, as shown in FIG. 16, magnets 8e having recesses 8f corresponding to the bolts 26 are embedded in the surface of the movable mold half 8. The magnets 8e can attract the bolts 26, which can be used as setting portions. Of course, nuts made from a magnetic substance may be embedded in the lower end surfaces of the base portion 14 instead of the bolts 26, and may be used as an attachment portion. This attachment portion may be utilized as a setting portion. For this purpose, convex magnets corresponding to the nuts may be burried in the stationary mold half 9.

Figure 17:
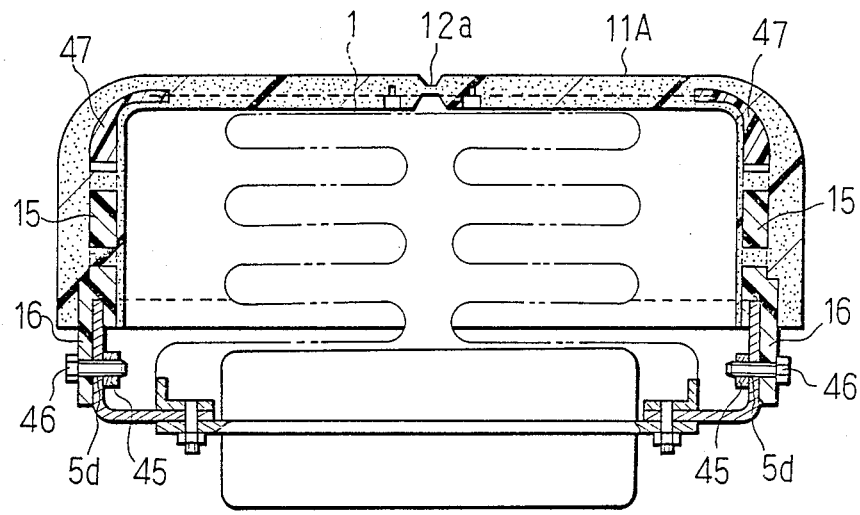
FIG. 17 is a cross-sectional view of the pad shown in FIGS. 1 and 2, for showing a further way in which the pad is mounted to mount members.

Further in the pad 11 shown in FIGS. 1 and 2, the rivets 6 are used to mount it to the backup plate 5. As shown in FIG. 17, nuts 45 may be welded to the fringes of the holes 45 on the inner side of backup plate 5. Bolts 46 whose front ends are rounded may be used to mount the pad.

Figure 18:
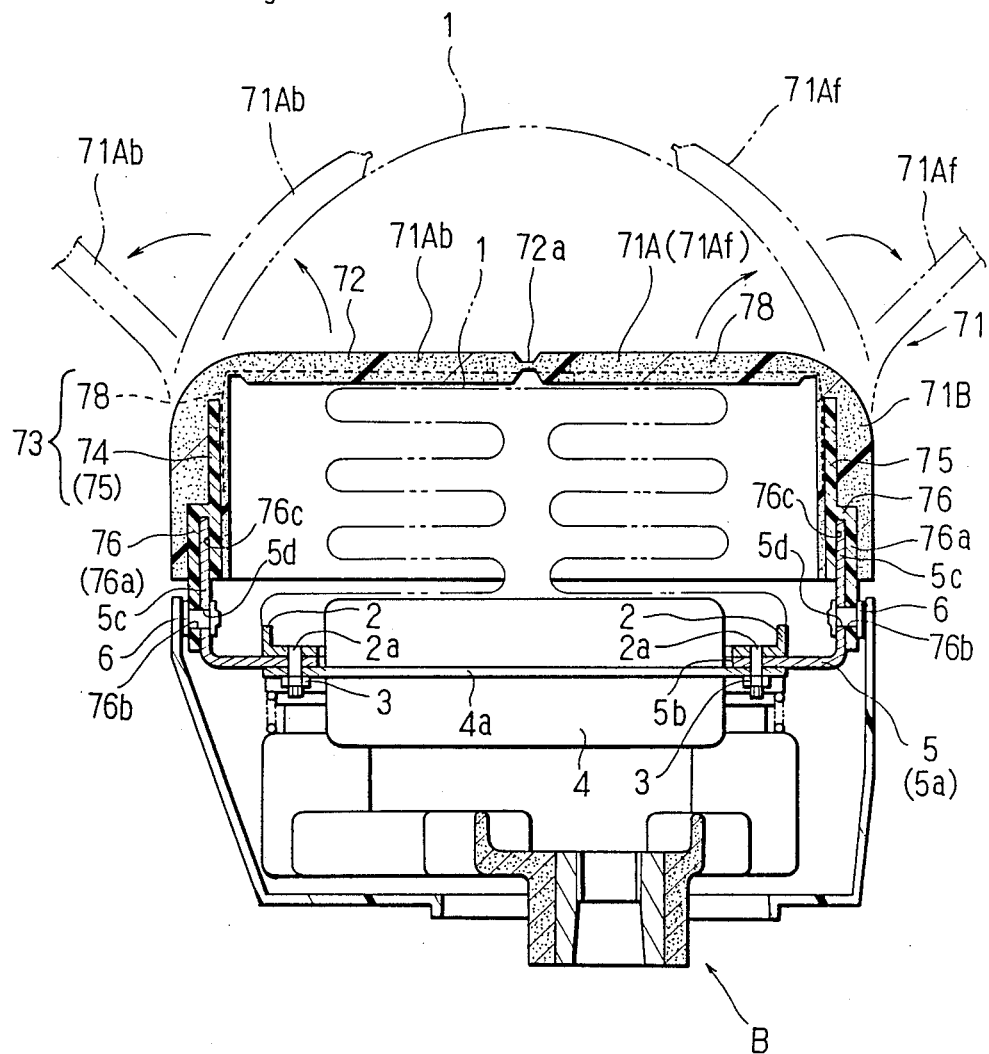
FIG. 18 is a cross-sectional view of another pad according to the invention, for showing the manner in which the pad is used.
Figure 19:
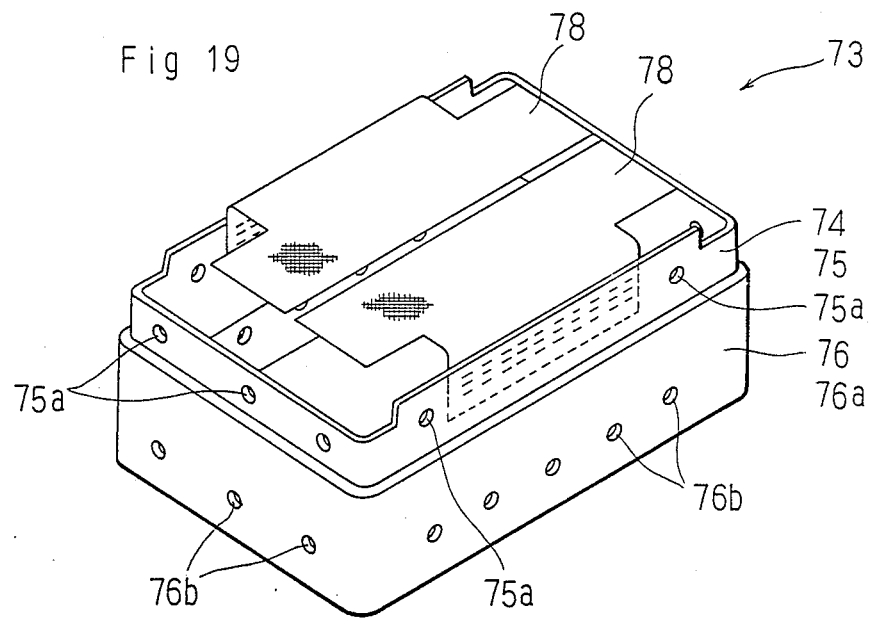
FIG. 19 is a perspective view of an insert for use with the pad shown in FIG. 18.

Furthermore, in the pad 11 shown in FIGS. 1 and 2, the nets 18 are burried in the upper portion of the base portion 14 to form the insert 13. Another pad 71 is shown in FIG. 18, where a net 78 is seamed to the top of a base portion 74 to form an insert 73. As shown in FIGS. 18 and 19, the pad 71 is shaped into a substantially rectangular parallelepiped having an upper wall 71A and side walls 71B similarly to the pad 11 shown in FIGS. 1 and 2. A coat layer 72 made from a soft synthetic resin, such as urethane, is formed on the insert 73. The coat layer 72 overlying the upper wall 71A has a substantially H-shaped thin-walled portion 72a so that the upper wall 71A may break into a front portion 71Af and a rear portion 71Ab when the air bag 1 inflates, in the same manner as the pad 11 shown in FIGS. 1 and 2.

As shown in FIGS. 18 and 19, the insert 73 comprises a box-like base portion 74 extending along the side walls 71B of the pad and two substantially rectangular nets 78 connected to the top of the base portion 74. The nets 78 are located over the upper wall 71A of the pad and on opposite sides of the thin-walled portion 72a of the coat layer 72.

Each net 78 is of about 1 mm meshes, woven from a synthetic fiber such as polyamide, and exhibits flexibility. When expanded, each net takes a widened T-shaped form. The lower end of the vertical portion of the letter "T" of each net 78 is seamed to the top of the body portion 75 of the base portion 74, so that the net is connected to the base portion 74. The seaming operation is performed using an industrial sewing machine or the like.

The base portion 74 is made from a rigid or semirigid synthetic resin, such as polyamide, vinyl chloride, or polyolefin. The base portion 74 comprises the body portion 75 and an attachment portion 76. The body portion 75 is shaped like a box and extends along the side walls 71B of the pad. The body portion 75 is provided with a plurality of holes 75a extending through it at given positions to prevent the coat layer 72 from peeling off.

The attachment portion 76 has an attaching plate portion 76a, holes 76b, and an annular groove 76c, similarly to the pad 11 shown in FIGS. 1 and 2.

Figure 20:
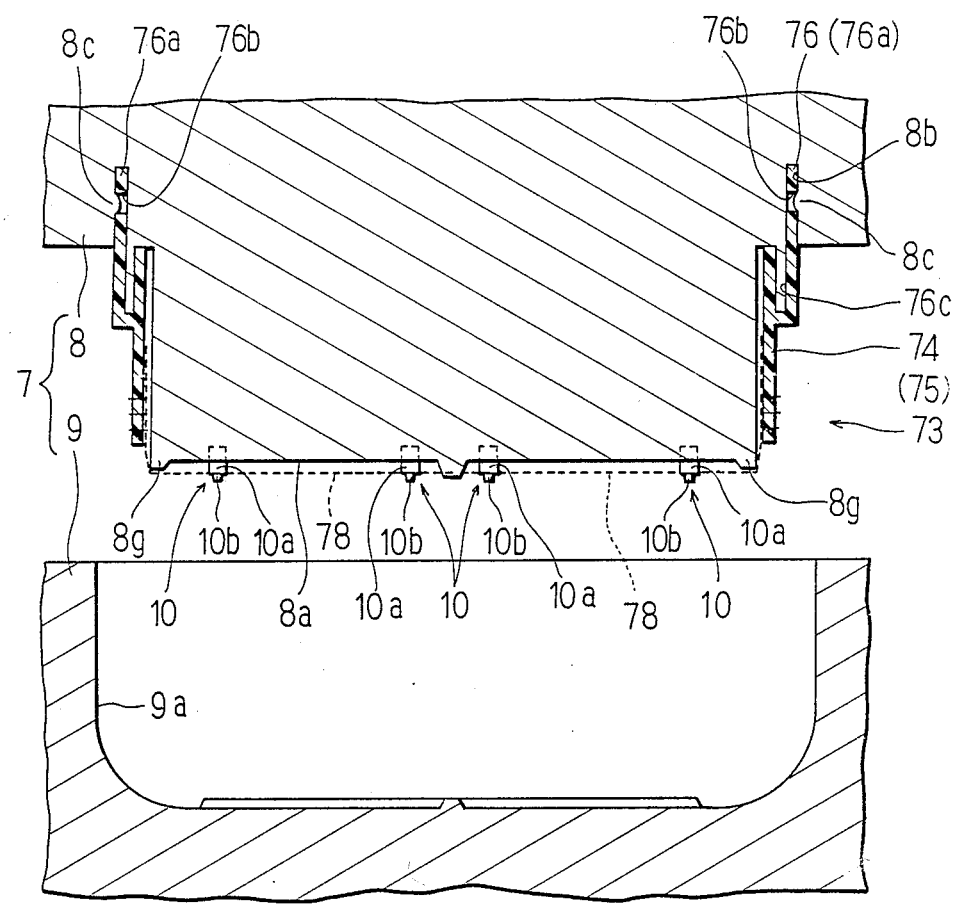
FIG. 20 is a cross-sectional view of a mold in which the insert shown in FIG. 19 is set.
Figure 22:
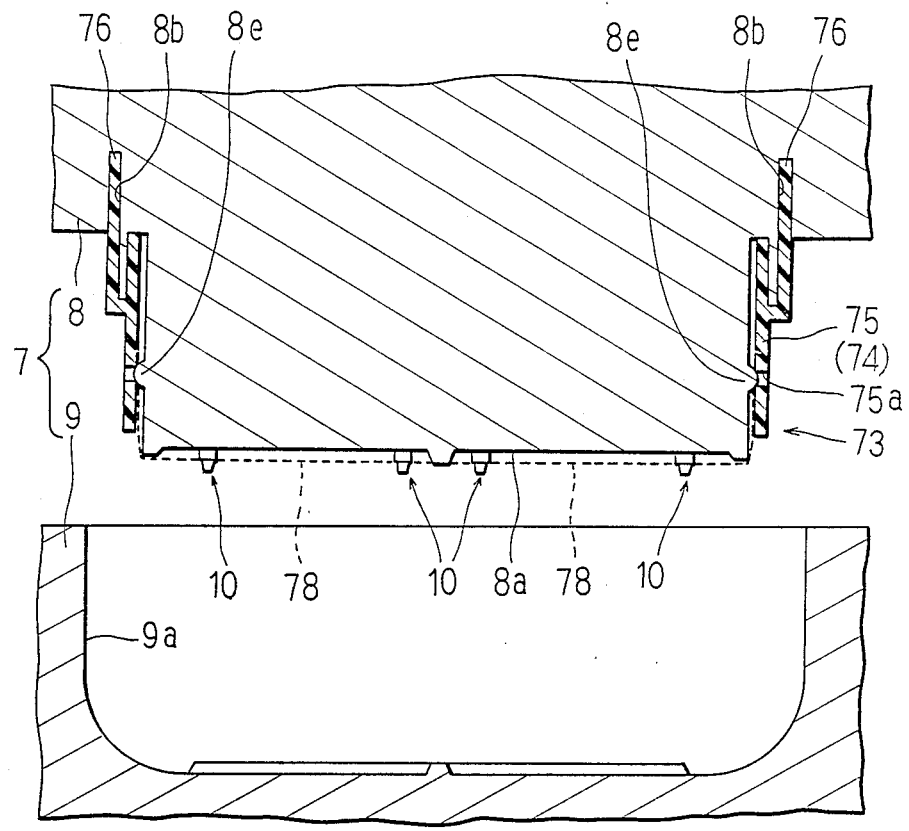
FIG. 22 is a cross-sectional view of another mold used to mold the pad shown in FIG. 18.

When the insert 73 is set in the mold 7 as shown in FIG. 20, it can be easily placed in position, because the base portion 74 of the pad 71 retains its original shape. Also in the insert 73 of the pad 71, the fringes of the holes 75a can be used as setting portions by providing protrusions 8e engaging the fringes of the holes 75a as in the mold 7 shown in FIG. 22.

As shown in FIG. 20, the movable mold half 8 has protrusions 8g to reduce the thickness of the fringes of the upper walls 71Af, 71Ab on opposite sides of the pad 71. This also allows the thin-walled portion 72a to break and enables the upper walls 71Af, 71Ab to easily swing open when the air bag 1 inflates.

Figure 21:
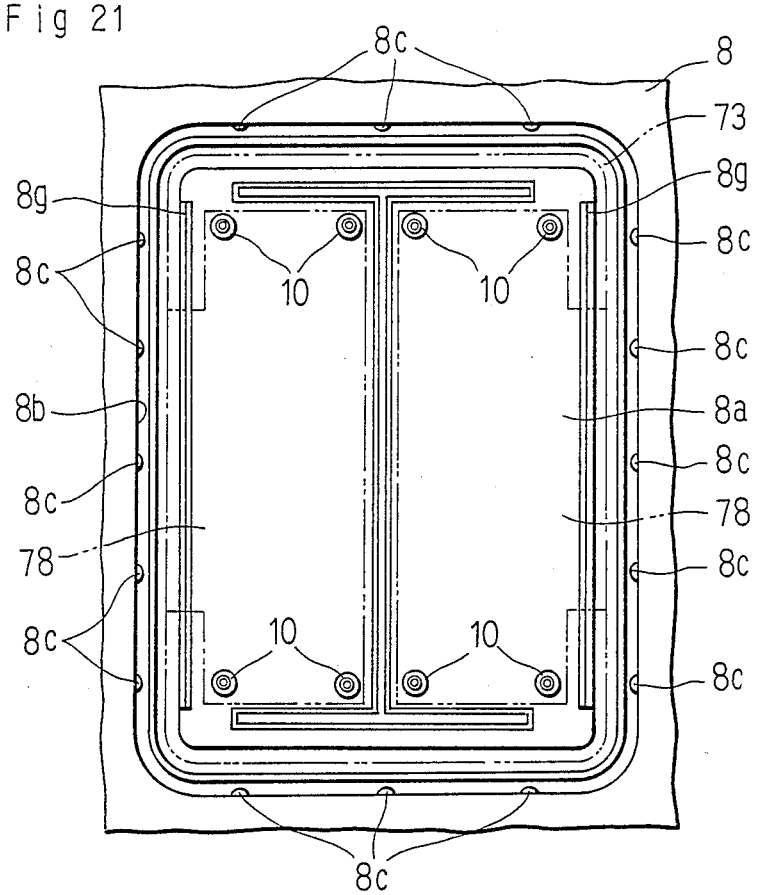
FIG. 21 is a bottom view of a movable mold half used to mold the pad shown in FIG. 18.

As shown in FIG. 21, eight set pins 10 are pressed into the inner surface 8a of the movable mold half 8 at four corners of each net 78 of the insert 73 on top of the upper wall 71 when the insert 73 has been placed in position.

Figure 23:
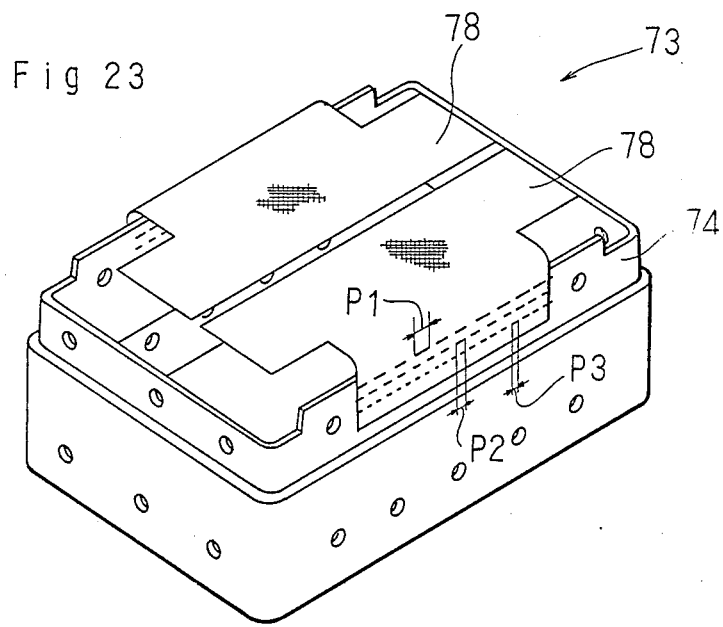
FIG. 23 is a perspective view of a modification of the insert shown in FIG. 19.

In the insert 73 of the pad 71 shown in FIGS. 18 and 19, the nets 78 are seamed to the inner surface of the base portion 74. In the insert 73 shown in FIG. 23, the nets 78 are seamed to the outer surface of the base portion 74. When the nets 78 are seamed, the lengths of the stitches $P_1$, $P_2$, $P_3$, etc. can be changed variously.

Figure 24:
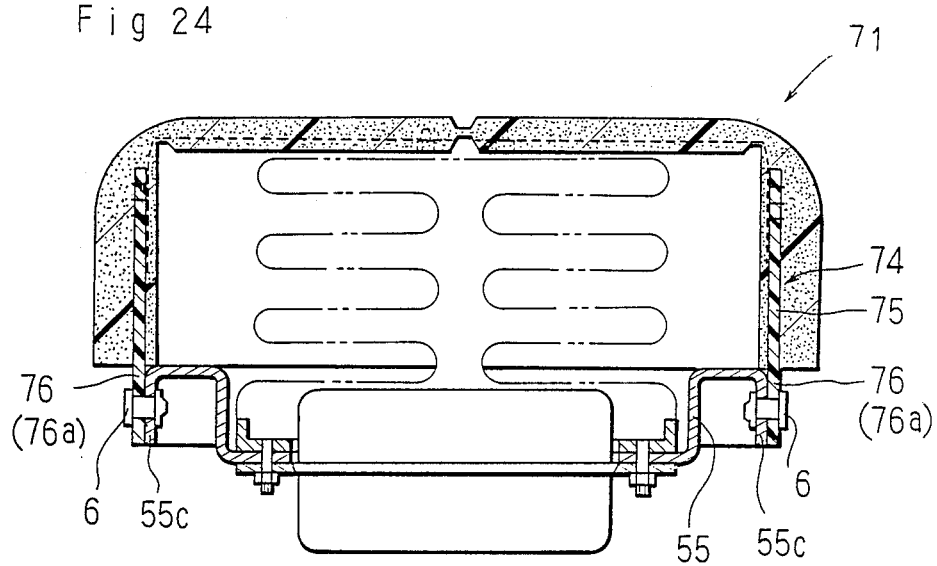
FIG. 24 is a cross-sectional view of the pad shown in FIG. 18, for showing another way in which the pad is mounted to mount members.
Figure 25:
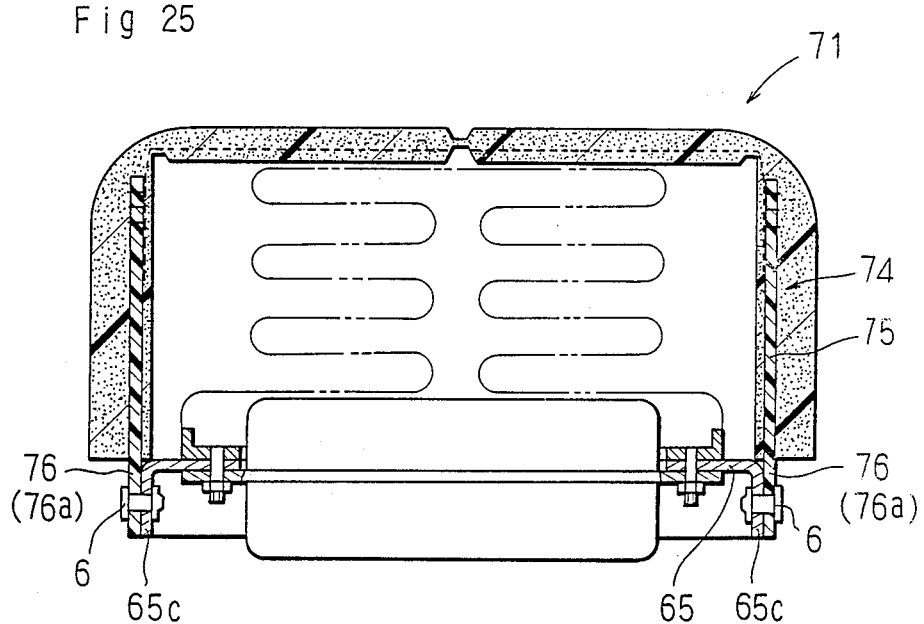
FIG. 25 is a cross-sectional view of the pad shown in FIG. 18, for showing a further way in which the pad is mounted to mount members.

In the above-described pad 71, the attachment portion 76 of the insert 73 is provided with the annular groove 76c in which the vertical wall portions 5c of the backup plate 5 is fitted. In the pad 71 shown in FIGS. 24 and 25, the fringes of the backup plates 55, 65 form downwardly facing vertical wall portions 55c, 65c. In this case, no annular groove is formed. The body portion 75 of the base portion 74 has a lower portion extending straight and acting as the attachment portion 76 or attaching plate portion 76a.

Figure 26:
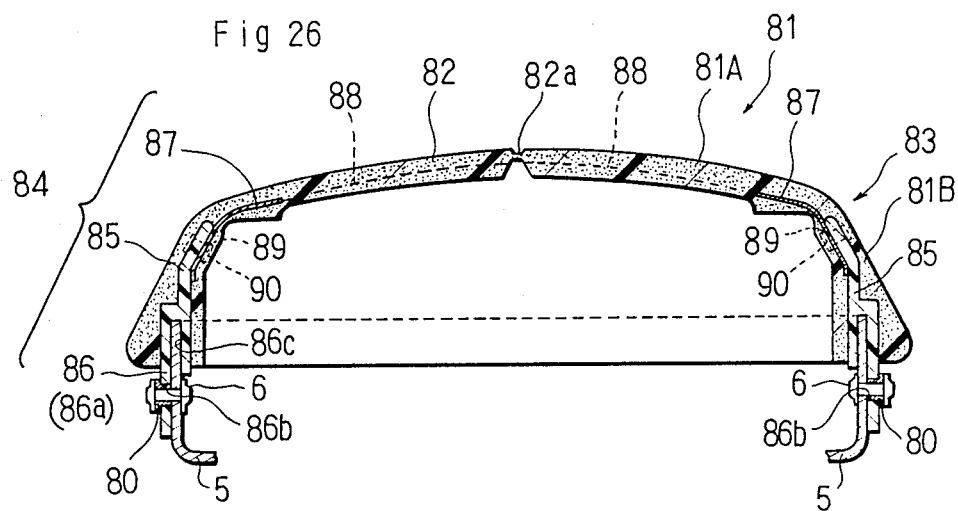
FIG. 26 is a cross-sectional view of a further pad according to the invention, for showing the manner in which the pad is used.
Figure 27:
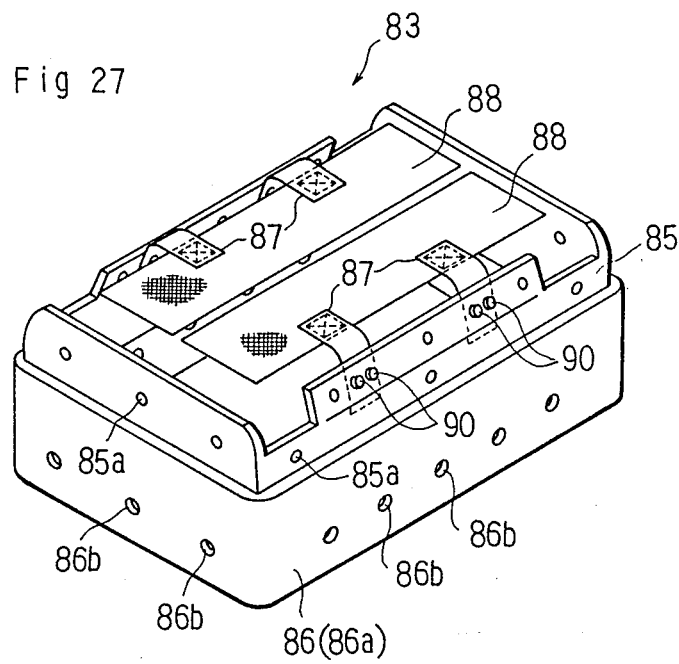
FIG. 27 is a perspective view of an insert for use with the pad shown in FIG. 26.

Referring next to FIG. 26, there is shown a further example of the pad. This pad, generally indicated by numeral 81, is similar to the first-mentioned pad 11 except that the connecting arms 17a of the retaining portion 17 of the pad 11 have been replaced by connecting belts 87 which are made from a polyamide or aramid fiber and have a large tensile strength. As shown in FIGS. 26 and 27, the belts 87 are fastened to the top of the body portion 85 of the base portion 84 in the insert 83 with rivets 90 and washers 89. The belts 87 are seamed to the nets 88. In this pad 81, the connecting belts 87 are used. The components of the pad 81, including the belts 87, are similar in material and shape to the counterparts of the first-mentioned pad 11. More specifically, the pad 81 is shaped into a substantially rectangular parallelepiped having an upper wall 81A and side walls 81B. The pad 81 includes a coat layer 82 having a thin-walled portion 82a. The body portion 85 of the base portion 84 of the insert 83 has a lower portion acting as an attachment portion 86 which has an attaching plate portion 86a, holes 86b, and an annular groove 86c, similarly to the attachment portion 16 of the pad 11 already described. The body portion 85 is also provided with holes 85a extending through it to prevent the coat layer 82 from peeling off. When the pad 81 is mounted to the backup plate 5 with the rivets 6, reinforcing metal collars 80 are used.

Figure 28:
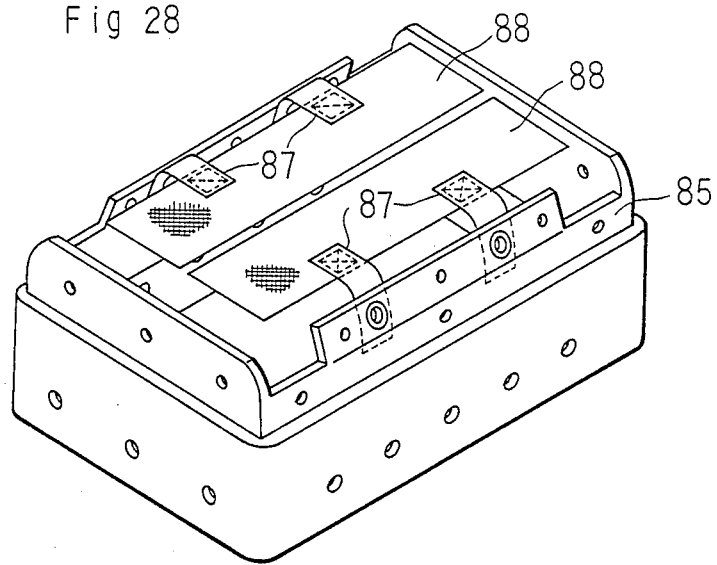
FIG. 28 is a perspective view of a modification of the insert shown in FIG. 27.

In this pad 81, the body portion 85 of the base portion 84 and the attachment portion 86 are made from a rigid or semirigid synthetic resin, such as a polyamide, vinyl chloride, or polyolefin fiber, in the same way as the pad 11 described first. Therefore, the pad can be readily set in a given mold for molding the coat layer 82, by making use of the holes 86b in the attachment portion 86 and the holes 85a in the body portion 85. The connecting bands 87 may be fastened to the body portion 85 with eyelets as shown in FIG. 28.

Figure 29:
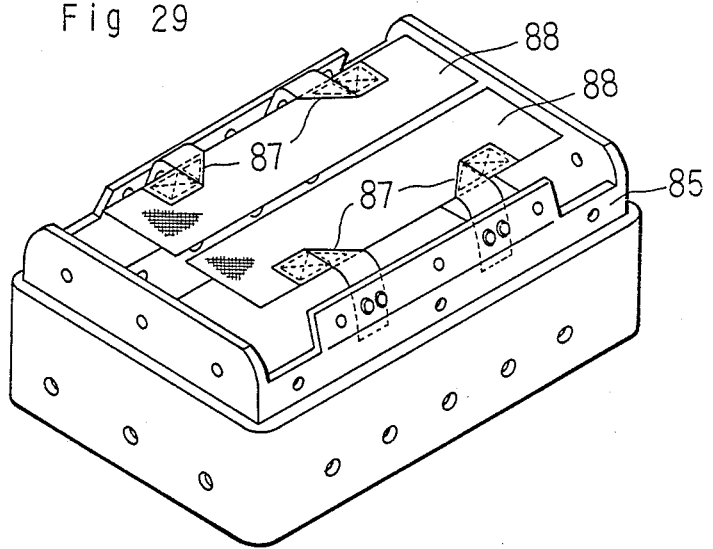
FIG. 29 is a perspective view of another modification of the insert shown in FIG. 27.
Figure 30:
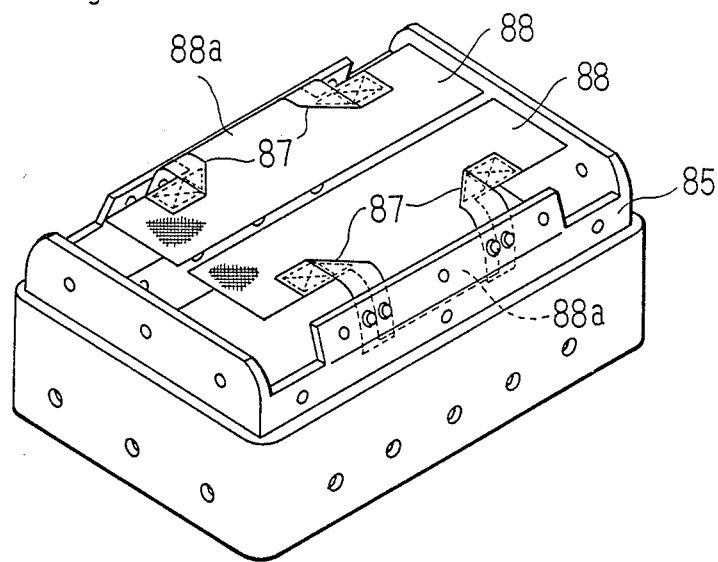
FIG. 30 is a perspective view of a further modification of the insert shown in FIG. 27.
Figure 31:
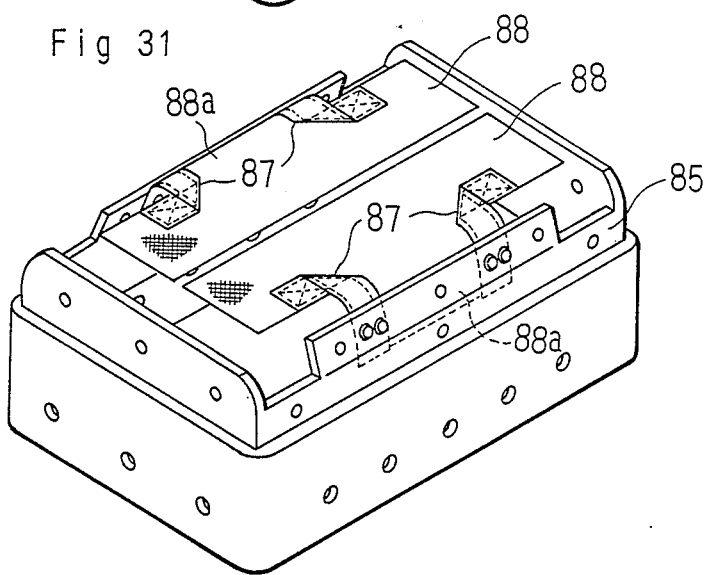
FIG. 31 is a perspective view of a yet other modification of the insert shown in FIG. 27.
Figure 32:
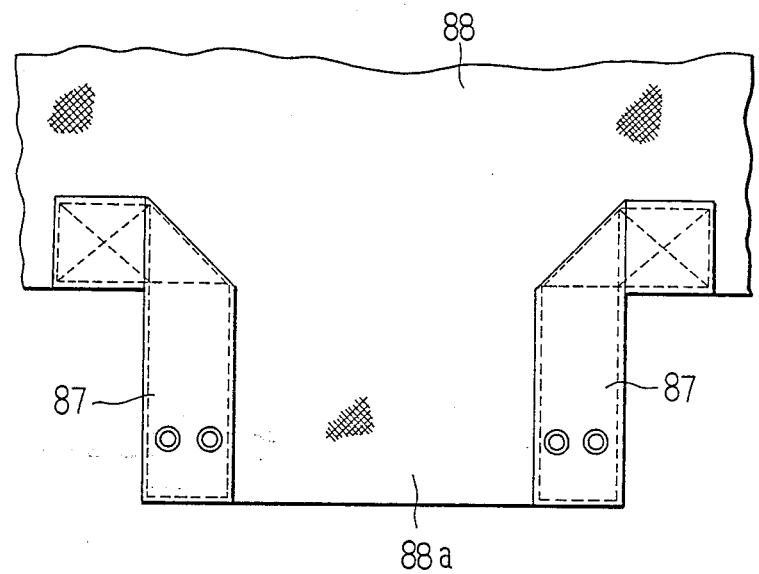
FIG. 32 is a top view of nets to which connecting belts are seamed.
Figure 33:
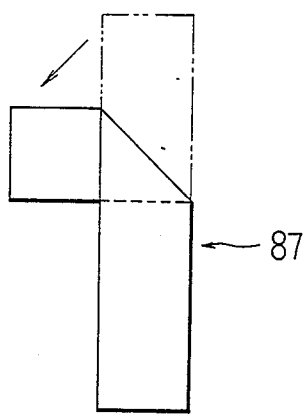
FIG. 33 is a top view of one connecting belt shown in FIG. 32, for showing the manner in which one belt is bent.

The connecting belts 87 can extend upwardly over a long distance and be bent near the upper ends as shown in FIG. 33. The bent portions can be seamed to the nets 8B, as shown in FIG. 29. In this case, the addition of the bent portions increases the strength of the connection with the nets 88.

Where the connecting belts 87 are bent and seamed to the nets BB in this way, the nets 88 can extend between the belts 87 as shown in FIG. 30, or extensions 88a to them can be seamed to the flexible belts 87 as shown in FIGS. 31 and 32.

Figure 34:
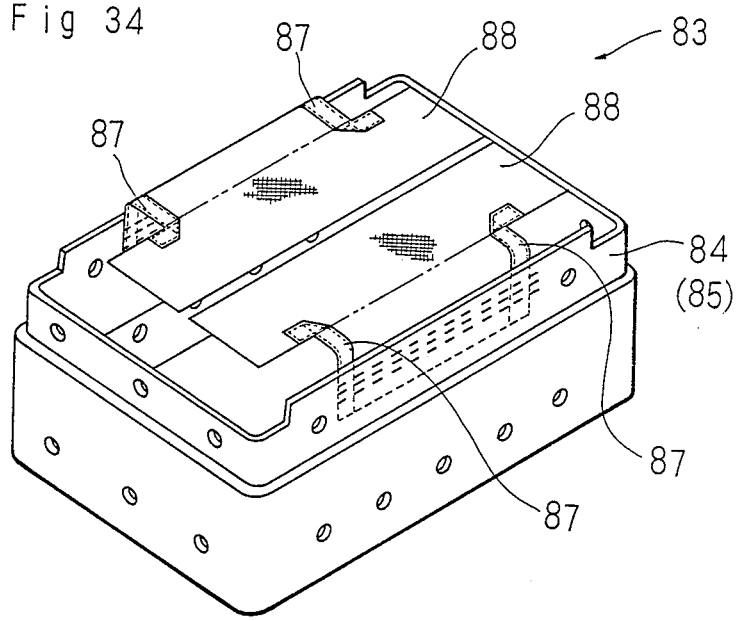
FIG. 34 is a perspective view of a still other modification of the insert shown in FIG. 27.

As shown in FIG. 34, the connecting belts 87 are seamed to the body portion S5 of the base portion 84, as well as to the nets 88. In this case, the estensions 88a of the nets S8 and the connecting belts 87 can be seamed together to the body portion 85. In FIG. 34, nets 88 having no extensions 88a are indicated by the phantom lines and connected to the body portion 85, using the belts 87. In the insert 83 shown in FIG. 34, all the connecting belts 87 are seamed to the nets 88 and the body portion 85 and, therefore, the fastening operation can be carried out with greater ease than cases where rivets or eyelets are employed.

Figure 35:
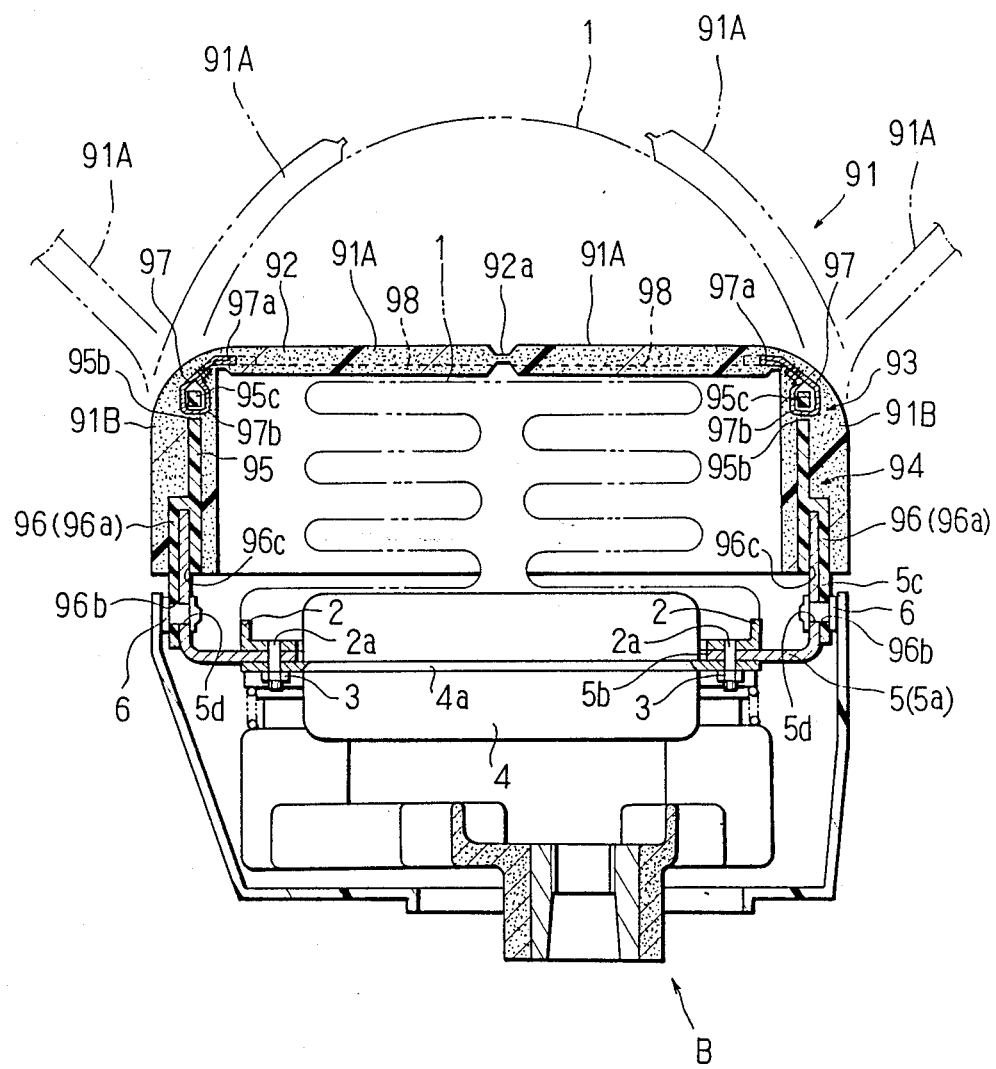
FIG. 35 is a cross-sectional view of a still other pad according to the invention, for showing the manner in which the pad is used.
Figure 36:
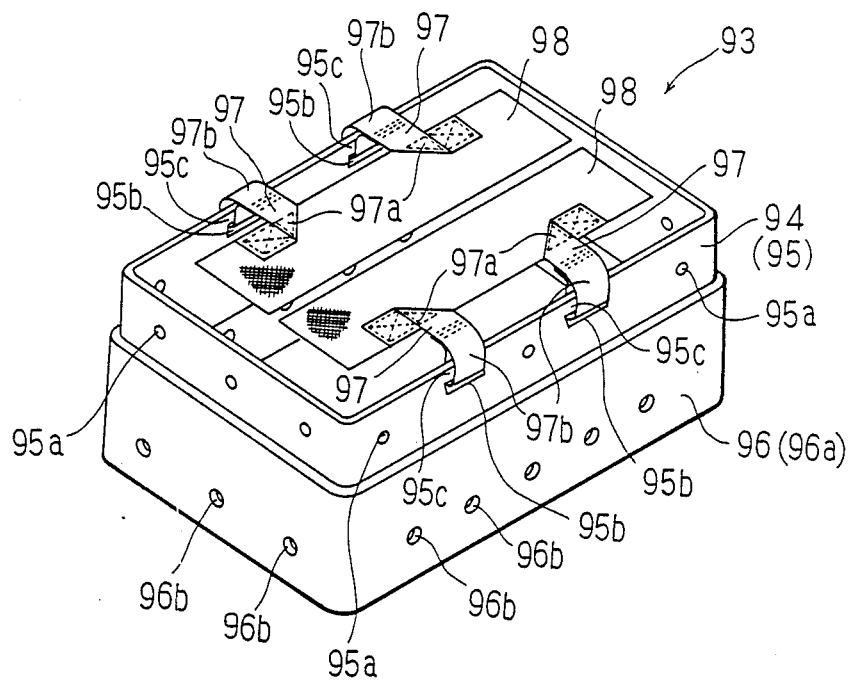
FIG. 36 is a perspective view of an insert for use with the pad shown in FIG. 35.

Referring to FIGS. 35 and 36, there is shown a yet other pad 91, in which connecting belts are connected to the body of the insert in a manner different from the foregoing. In this pad 91, rectangular holes 95b are formed in the upper portion of the body portion 95 of the base portion 94 in the insert 93. Rectangular tubular portions 97b which are bent and seamed are formed at the lower ends of the connecting belts 97. The upper fringes of the holes 95b in the body portion 95 form pivotal portions 95c around which the tubular portions 97b extend. Upper portions of the belts 97 are bent, and the bent portions 97a are seamed to the nets 98.

In this pad 91, the tubular portions 97b of the connecting belts 97 are connected to the pivotal portions 95c of the body portion 95. The components if the pad 91 are similar in material and shape to the counterparts of the above-described pad 81. In particular, the upper wall 91A and the side walls 91B form a box-like structure. The coat layer 92 has the thin-walled portion 82a. The body portion 95 of the base portion 94 of the insert 93 is provided with the holes 95a extending through it to keep the coat layer 92 from peeling off. The attachment portion 96 comprising the attaching plate portion 96a, the holes 96b, and the annular groove 96c is formed in the lower part of the body portion 95.

Figure 37:
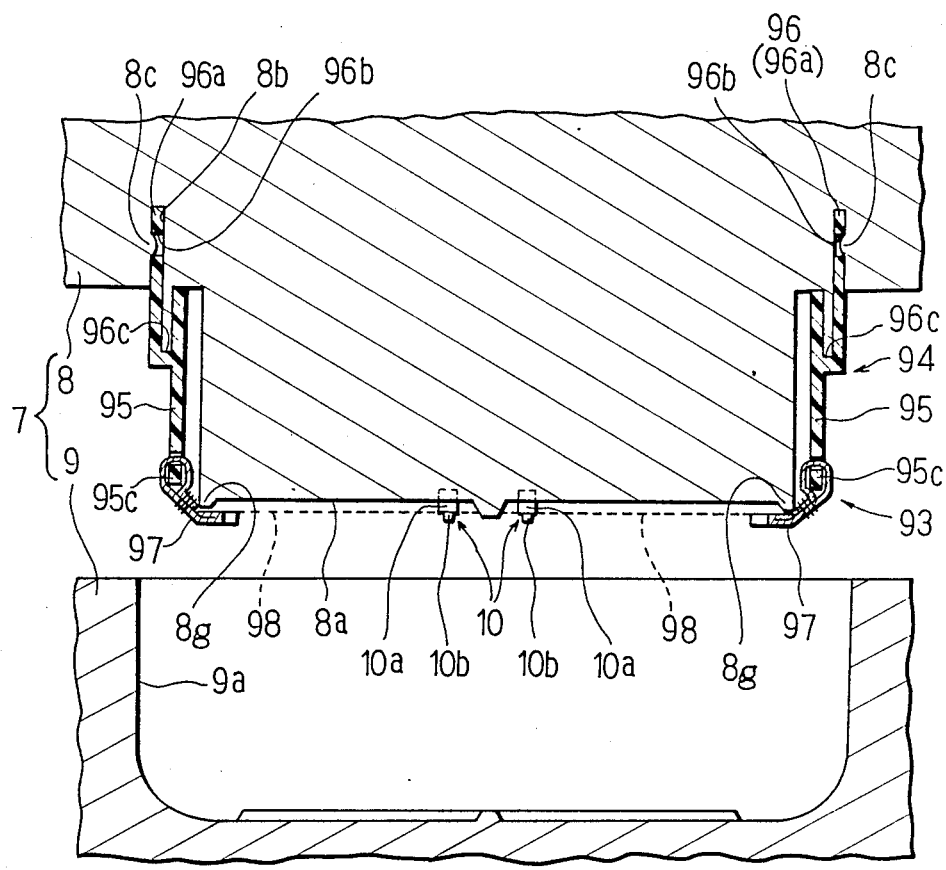
FIG. 37 is a cross-sectional view of a mold in which the insert shown in FIG. 36 is set.
Figure 38:
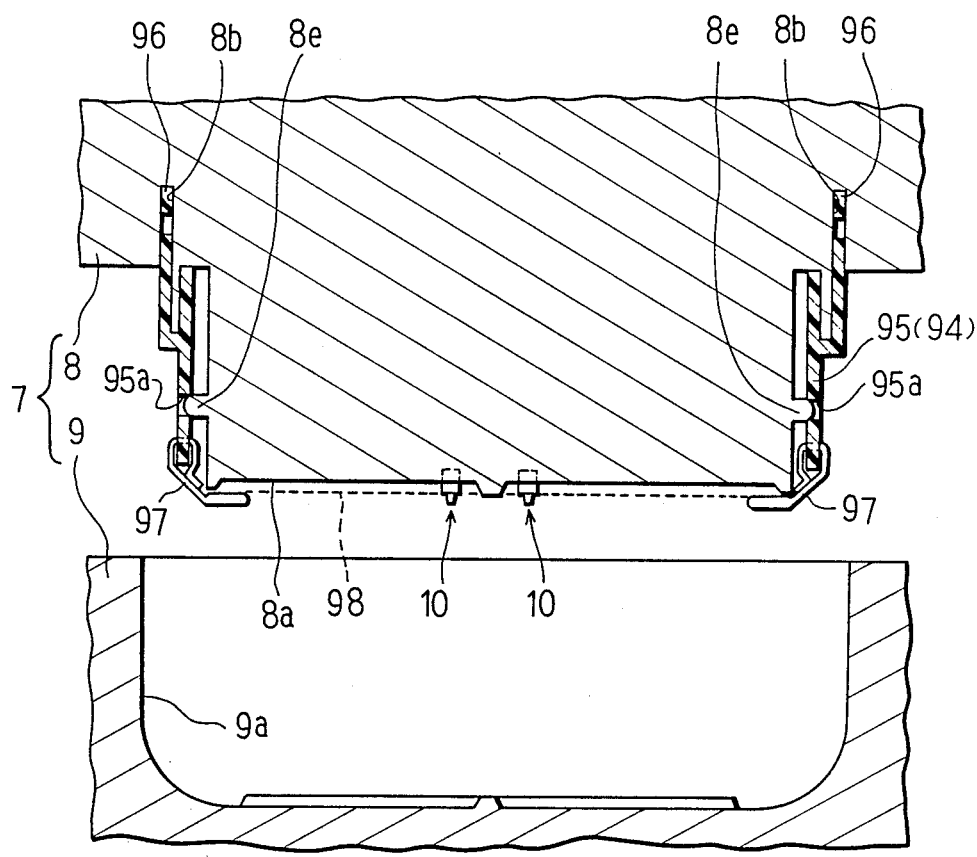
FIG. 38 is a cross-sectional view of another mold used to mold the pad shown in FIG. 35.

When the coat layer 92 of the pad 91 is molded, the pad can be readily set in the given mold 7 by utilizing the holes 96b in the attachment portion 96 and the holes 95b in the body portion 95, as shown in FIGS. 37 and 38.

In the aforementioned pad 91, the holes 95b used for installation are formed near the upper end of the body portion 95 of the base portion 94. The upper fringes of the holes 95b form the pivotal portions 95c which are inserted in the tubular portions 97b at the lower ends of the connecting belts 97. Thus, the belts 97 are connected to the base portion 94.

Figure 39:
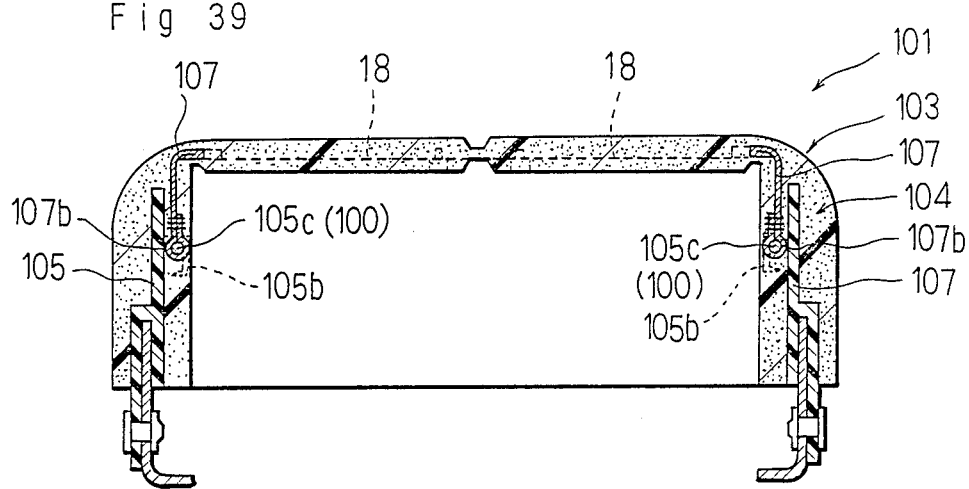
FIG. 39 is a cross-sectional view of a modification of the pad shown in FIG. 35.
Figure 40:
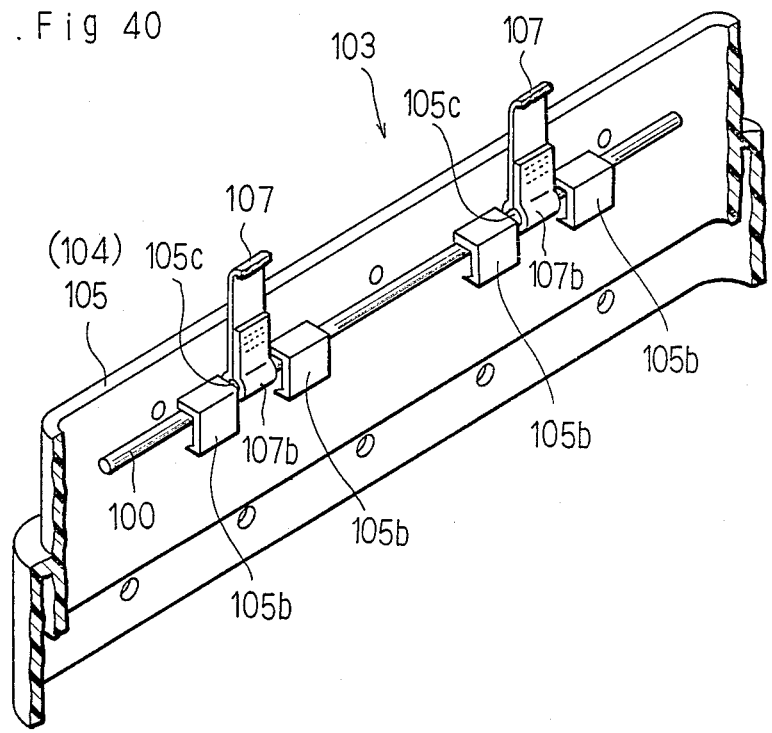
FIG. 40 is a perspective view of an insert for use with the pad shown in FIG. 39.

Referring to FIG. 39, there is shown a still further pad 101 having hooked portions 105b arranged horizontally. Each hooked portion 105b takes an inverted L-shaped form in cross section, and is formed integrally with the base portion 104 of the insert 103. The hooked portions 105b are disposed at given positions on the inner surface of the body portion 105 of the base portion 104. Shaft members 100 which are made of round rods and have rigidity such as steel are fitted over the hooked portions 105b from below. The shaft members 100 are used as the pivotal portions 105c of the base portion 104. The connecting belts 107 are connected to the base portion 104 by fitting the tubular portions 107b at the lower ends of the connecting belts 107 in the pivotal portions 105c as shown in FIG. 40.

Figure 41:
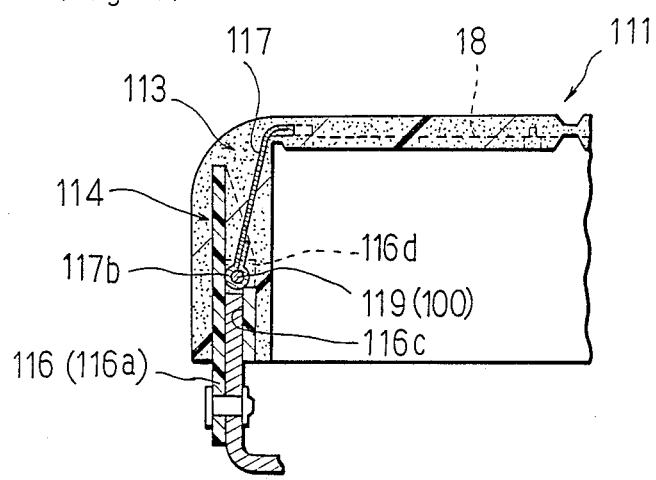
FIG. 41 is a cross-sectional view of a further modification of the pad shown in FIG. 35.
Figure 42:
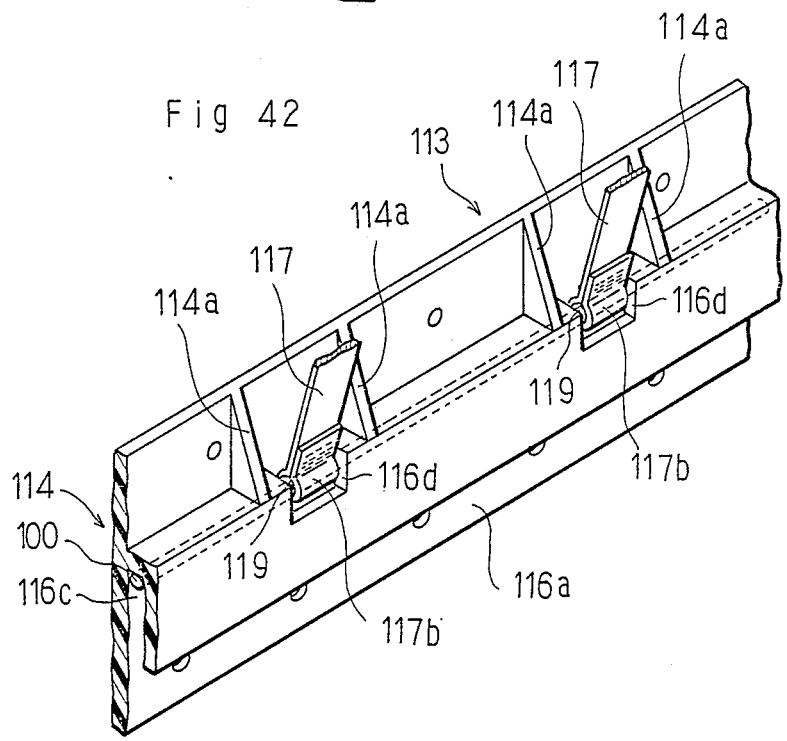
FIG. 42 is a fragmentary perspective view of an insert for use with the pad shown in FIG. 41.

Referring to FIG. 41, a pad 111 comprises an insert 113 having a base portion 114 including an attachment portion 116. An annular groove 116c is formed in the inner surface of the attaching plate portion 116a of the attachment portion 116. Openings 116d which face upward are formed at given positions in the annular groove 116c. Shaft members 100 are fitted in the groove 116c to form the pivotal portions 119 of the base portions 114. Tubular portions 117 at the lower ends of connecting belts 117 are inserted in the pivotal portions 119 through the openings 116d. Thus, the belts 117 are connected to the base portion 114, as shown in FIG. 41. Indicated by reference numeral 114a are reinforcing ribs.

The inserts 103 and 113 of the pads 101 and 111 are fabricated in the manner described below. First, the upper ends of the connecting belts 107 and 117 are seamed to the nets 18. The lower ends of the belts 107 and 117 are seamed to form the tubular portions 107b and 117b. The shaft members 100 are inserted into the tubular portions 107b and 117b, and then fitted into the base portions 104 and 114 at given locations. For the pad 111, when the shaft members 100 are inserted into the tubular portions 117b, it is necessary that the tubular portions 117b of the belts 117 protrude close to the lower ends of the attaching plate portions 116a through the openings 116d in the base portion 114.

In the pads 91, 101, and 111, two connecting belts 97, 107, 117 are respectively used for one net 18. Of course, each net 18 can also be connected to the base portion 94, 104, or 114 via one, three, or more connecting belts.

In the pads 11, 71, 81, 91, the backup plates 5 are used as the mount members to which the pads 11, 71, 81, 91 are mounted. However, the mount members are not restricted to the backup plate 5 rigidly fixed to the steering wheel. For example, where the pad is attached to the instrument panel, the rear surface of one front passenger's seat, or other location, a frame-like or annular bracket mounted on the panel or the rear surface may be used.

What is claimed is:

1. A pad for use in an air bag device enclosing an air bag which inflates in case of an accident, the air bag device being mounted to mount members disposed around the air bag, said pad comprising:
    an upper wall;
    side walls extending downward from the fringes of the upper wall;
    inserts disposed inside the upper wall and the side walls;
    a coat layer formed on the inserts by injection molding from a soft synthetic resin so as to cover the upper wall and the side walls;
    a thin-walled portion which is formed in the coat layer on the upper wall and which, when the air bag inflates, breaks;
    a rectangular tubular base portion made from a synthetic resin and forming the inserts disposed inside the side walls;
    a plurality of flexible nets forming the insert disposed inside the upper wall, the nets being located on opposite sides of the thin-walled portion in the coat layer, the nets being connected to the top of the base portion;
    an attachment portion formed on the base portion and mounted to the mount members; and
    setting portions formed on the base portion and acting to set the inserts in a mold used to mold the coat layer.

2. A pad for use in an air bag device as set forth in claim 1, wherein said nets are burried in the base portion and connected to the base portion.

3. A pad for use in an air bag device as set forth in claim 2, wherein said nets are connected to the top of the base portion disposed inside the side walls.

4. A pad for use in an air bag device as set forth in claim 2, wherein retaining portions extending to the upper wall are formed on the base portion, and wherein said nets are connected to the retaining portions.

5. A pad for use in an air bag device as set forth in claim 1, wherein said nets are seamed and connected to the base portion.

6. A pad for use in an air bag device as set forth in claim 1, wherein said attachment portion comprises an attaching plate extending downward from near the bottom of the base portion and a groove formed inside the attaching plate and at the lower end of the base portion, the attaching plate being provided with holes at given positions, and wherein said setting portions utilize the fringes of the holes in the attaching plate.

7. A pad for use in an air bag device as set forth in claim 1, wherein said attachment portion comprises an attaching plate extending downward from near the base portion and a groove formed inside the attaching plate and at the lower end of the base portion, the attaching plate being provided with holes at given positions, and wherein said setting portions utilize the fringes of holes extending through the base portion to prevent the coat layer from peeling off.

8. A pad for use in an air bag device as set forth in claim 1, wherein said attachment portion consists of bolts burried in the lower portion of the base portion and protruding downward, the bolts being made from a magnetic substance, and wherein the setting portions utilize the bolts.

9. A pad for use in an air bag device enclosing an air bag which inflates in case of an accident, the air bag device being mounted to mount members disposed around the air bag, said pad comprising:
    an upper wall;
    side walls extending downward from the fringes of the upper wall;
    inserts disposed inside the upper wall and the side walls;
    a coat layer formed on the inserts by injection molding from a soft synthetic resin so as to cover the upper wall and the side walls;
    a thin-walled portion which is formed in the coat layer on the upper wall and which, when the air bag inflates, breaks;
    a rectangular tubular base portion made from a synthetic resin and forming the inserts disposed inside the side walls;
    a plurality of flexible nets forming the insert disposed inside the upper wall, the nets being located on opposite sides of the thin-walled portion in the coat layer, the nets being connected to the top of the base portion;
    flexible connecting belts which form the inserts and connect the nets to the base portion;
    an attachment portion formed on the base portion and mounted to the mount members; and
    setting portions formed on the base portion and acting to set the inserts in a mold used to mold the coat layer.

10. A pad for use in an air bag device as set forth in claim 9, wherein said connecting belts are seamed to the nets and coupled to the base portion with rivets.

11. A pad for use in an air bag device as set forth in claim 9, wherein said connecting belts are seamed to the nets and coupled to the base portion with eyelets.

12. A pad for use in an air bag device as set forth in claim 9, wherein said base portion has pivotal portions inserted in tubular portions formed at the lower ends of the connecting belts, and wherein the belts are seamed to the nets, whereby the belts are connected to the base portion.

13. A pad for use in an air bag device as set forth in claim 9, wherein said connecting belts are seamed and coupled to the nets and the base portion.

14. A pad for use in an air bag device as set forth in claim 13, wherein said nets are disposed on only the upper wall.

15. A pad for use in an air bag device as set forth in claim 13, wherein said nets have extension portions extending to the base portion, and wherein the connecting belts are seamed to the fringes of the extension portions.

16. A pad for use in an air bag device as set forth in claim 13, wherein said connecting belts have upper portions bent along the fringes of the nets and seamed to the nets.

17. A pad for use in an air bag device as set forth in claim 9, wherein said attachment portion comprises an attaching plate extending downward from near the base portion and a groove formed inside the attaching plate and at the lower end of the base portion, the attaching plate being provided with holes at given positions, and wherein said setting portions utilize the fringes of the holes in the attaching plate.

18. A pad for use in an air bag device as set forth in claim 9, wherein said attachment portion comprises an attaching plate extending downward from near the base portion and a groove formed inside the attaching plate and at the lower end of the base portion, the attaching plate being provided with holes at given positions, and wherein the setting portions utilize the fringes of holes extending through the base portions to prevent the coat layer from peeling off.

* * * * *